United States Patent
Chakrabarti et al.

(10) Patent No.: US 10,204,142 B2
(45) Date of Patent: Feb. 12, 2019

(54) PROGRESSIVE SPATIAL SEARCHING USING AUGMENTED STRUCTURES

(71) Applicant: Microsoft Technology Licensing, LLC, Redmond, WA (US)

(72) Inventors: Kaushik Chakrabarti, Redmond, WA (US); Surajit Chaudhuri, Redmond, WA (US); Senjuti Basu Roy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 700 days.

(21) Appl. No.: 14/556,232

(22) Filed: Nov. 30, 2014

(65) Prior Publication Data
US 2015/0088904 A1 Mar. 26, 2015

Related U.S. Application Data

(62) Division of application No. 12/981,082, filed on Dec. 29, 2010, now Pat. No. 8,930,391.

(51) Int. Cl.
*G06F 17/30* (2006.01)
*G01C 21/36* (2006.01)

(52) U.S. Cl.
CPC ...... *G06F 17/3053* (2013.01); *G01C 21/3611* (2013.01); *G01C 21/3679* (2013.01);
(Continued)

(58) Field of Classification Search
CPC .................................................. G06F 17/3053
(Continued)

(56) References Cited

U.S. PATENT DOCUMENTS 7,603,360 B2 10/2009 Ramer et al.
7,774,002 B1 8/2010 Ortega et al.
(Continued)

OTHER PUBLICATIONS

Bast, H., et al., "Type Less, Find More: Fast Autocompletion Search with a Succinct Index", The 29th Annual International SIGIR Conference, Aug. 6-10, 2006, pp. 364-371, (Available for download on Dec. 14, 2010 from <<http://citeseerx.ist.psu.edu/viewdoc/download;jsessionid=19C71C7129A5DEE82D94057EC6510E1A?doi=10.1.1.95.3776&rep=rep1&type=pdf>>).
(Continued)

*Primary Examiner* — Syling Yen
(74) *Attorney, Agent, or Firm* — Ranjeev Singh; Singh Law, PLLC

(57) ABSTRACT

A location associated with a user of a computing device and a prefix portion of an input string may be received as one or more successive characters of the input string are provided by the user via the computing device. A list of suggested items may be obtained based on a function of respective recommendation indicators and proximities of the items to the location in response to receiving the prefix portion, and based on partially traversing a character string search structure having a plurality of non-terminal nodes augmented with bound indicators associated with spatial regions. The list of suggested items and descriptive information associated with each suggested item may be returned to the user, in response to receiving the prefix portion, for rendering an image illustrating indicators associated with the list in a manner relative to the location, as the user provides each successive character of the input string.

20 Claims, 19 Drawing Sheets

(52) U.S. Cl.
CPC .. *G06F 17/30091* (2013.01); *G06F 17/30241* (2013.01); *G06F 17/30864* (2013.01)

(58) Field of Classification Search
USPC ....... 707/706, 713, 722, 736, 748, 758, 759, 707/760, 764, 769, 781, 999.002–999.006
See application file for complete search history.

(56) References Cited

U.S. PATENT DOCUMENTS

| | | | |
|---|---|---|---|
| 7,788,248 B2 | 8/2010 | Forstall et al. | |
| 2006/0022048 A1* | 2/2006 | Johnson | H04L 69/329 235/462.1 |
| 2008/0122848 A1* | 5/2008 | Goldberg | G01C 21/3446 345/440 |
| 2010/0131850 A1* | 5/2010 | Berus | G01C 21/3632 715/727 |
| 2010/0250552 A1 | 9/2010 | Egnor | |
| 2010/0287178 A1 | 11/2010 | Lambert et al. | |
| 2010/0306228 A1* | 12/2010 | Carpenter | G06F 17/3064 707/765 |
| 2011/0013837 A1* | 1/2011 | Bergman | G06T 7/187 382/173 |
| 2011/0196933 A1* | 8/2011 | Jackson | G06Q 10/107 709/206 |
| 2011/0218885 A1* | 9/2011 | Manski | G06Q 30/0282 705/27.1 |

OTHER PUBLICATIONS

Bentley, J. L., "Multidimensional Binary Search Trees in Database Applications", IEEE Transactions on Software Engineering, vol. SE-5, No. 4, Jul. 1979, pp. 333-340.
Chaudhuri, S., et al., "Extending Autocompletion to Tolerate Errors", Proc. International Conference on Management of Data, Jun. 29-Jul. 2, 2009, pp. 708-718.
Cong, G., et al., "Efficient Retrieval of the Top-k Most Relevant Spatial Web Objects", Proceedings of the VLDB, vol. 2, No. 1, Aug. 2009, pp. 337-348.
Cormen, T.H., et al., Introduction to Algorithms, Second Edition, 2001, (Available for download on Dec. 14, 2010 from <<http://u.cs.biu.ac.il/~louzouy/courses/algorithms/korman.pdf>>), 984 Pages.
Darragh, J.J., et al., "Adaptive predictive text generation and the reactive keyboard", Interacting with Computers, vol. 3, No. 1, 1991, pp. 27-50.
Fagin, R., et al., "Optimal aggregation algorithms for middleware", J. Comput. Syst. Sci., vol. 66, No. 4, 2003, pp. 614-656, (Available for download on Dec. 14, 2010 from << http://www.almaden.ibm.com/cs/people/fagin/jcss03.pdf >>).
Felipe, I.D., et al., "Keyword Search on Spatial Databases", IEEE 24th International Conference on Data Engineering, Apr. 7-12, 2008, pp. 656-665, (Available for download on Dec. 14, 2010 from <<http://users.cis.fiu.edu/~vagelis/publications/Keyword%20Search%20on%20Spatial%20Databases%20icde08.pdf >>).
Finkel, R.A., et al., "Quad Trees A Data Structure for Retrieval on Composite Keys", Acta Informatica, vol. 4, 1974, pp. 1-9.
Garofalakis, M., et al., "Deterministic Wavelet Thresholding for Maximum-Error Metrics", Proceedings of the Twenty-third ACM SIGACT-SIGMOND-SIGART Symposium on Principles of Database Systems (PODS 2004), Jun. 14-16, 2004, pp. 166-176.

Li, G., et al., "Efficient Type-Ahead Search on Relational Data: a TASTIER Approach", Proceedings of the ACM SIGMOD International Conference on Management of Data, Jun. 29-Jul. 2, 2009, pp. 695-706, (Available for download on Dec. 14, 2010 from << http://dbgroup.cs.tsinghua.edu.cn/ligl/papers/sigmod09-tastier-db.pdf >>).
"Master advanced features: My Location", Available for download on Nov. 4, 2010 from <<http://www.google.com/support/toolbar/bin/answer.py?answer=166104&ctx=mi&hl=en>>, 2 pages.
Muthukrishnan, S., et al., "On Rectangular Partitionings in Two Dimensions: Algorithms, Complexity, and Applications", Proceedings of the International Conference on Database Theory, 1999, pp. 236-256 (21 pages).
Nandi, A., et al., "Assisted Querying using Instant-Response Interfaces", Proceedings of the ACM SIGMOD International Conference on Management of Data, Jun. 12-14, 2007, pp. 1156-1158 (3 pages).
Nievergelt, J., et al., "The Grid File: An Adaptable, Symmetric Multikey File Structure", ACM Transactions on Database Systems (TODS), vol. 9, No. 1, Mar. 1984, pp. 38-71.
Perez, M., et al., "Efficient Coding of Quadtree Nodes", Proceedings of International Conference on Computational Science (3), 2006, pp. 13-16.
Rigaux, P., et al., Spatial Databases with Application to GIS, 2002, Available for download on Dec. 14, 2010 from <<http://dctrl.fi-b.unam.mx/~paco/Tareas/Sistemas%20de%20control/spatial-databases-with-application-to-gis-the-morgan-kaufmann-series-in-data-management-systems.9781558605886.37354.pdf>>, 440 pages.
Russopoulos, N., et al., "Nearest Neighbor Queries", Proceedings of the 1995 ACM SIGMOD International Conference on Management of Data, pp. 71-79.
"Search box should clear itself after a certain period and/or not carry over from tab to tab", Available for download on Oct. 12, 2010 from << https://firefox.uservoice.com/forums/57440-firefox-4-beta/suggestions/890223-search-box-should-clear-itself-after-a-certain-per >>, 2 pages.
Smykil, J., "Google intros location-aware search for Safari on iPhone", (Available for download on Oct. 12, 2010) from << http://arstechnica.com/apple/news/2009/07/google-intros-location-aware-search-for-safari-on-iphone.ars >>, Jul. 20, 2009, 1 page.
"Study Shows Double Digit Growth of Local Mobile Usage, Unlocking Access to Younger, Wealthier, On-the-Go Consumers", (Available for download on Dec. 14, 2010) from << http://www.marketwire.com/press-release/Study-Shows-Double-Digit-Growth-Local-Mobile-Usage-Unlocking-Access-Younger-Wealthier-1297436.htm<<, Jul. 29, 2010, 3 pages.
Trifa, V., et al., "Design of a Web-based Distributed Location-Aware Infrastructure for Mobile", (Available for download on Oct. 12, 2010) from << http://www.webofthings.com/wot/2010/pdfs/150.pdf >>, May 23, 2010, pp. 714-719.
Zeman, E., "Google Launches Location-Aware Search for Windows Mobile", (Available for download on Oct. 12, 2010) from << http://www.informationweek.com/blog/main/archives/2008/09/google_launches_1.html; jsessionid=BVQ1SQZEKGM-3LQE1GHPSKHWATMY32JVN >>, Sep. 11, 2008, 3 pages.
Basu Roy et al., "Location-Aware Type Ahead Search on Spatial Databases: Semantics and Efficiency," Retrieved Oct. 17, 2012 at <<http://research.microsoft.com/pubs/145446/sigmod310-basuroy.pdf>>, In Proceedings of the 2011 ACM SIGMOD International Conference on Management of Data (SIGMOD '11), Athens, Greece, on Jun. 12-16, 2011, pp. 361-372.

* cited by examiner

| ID | String | Location | Static Score |
|---|---|---|---|
| 510 $O_1$ | Target | (3,9) | 200 |
| 512 $O_2$ | Thai Basil Leaf Restaurant | (50,30) | 5 |
| 514 $O_3$ | Sushi Rock | (9,50) | 7 |
| 516 $O_4$ | Shanghai Garden | (38,5) | 10 |
| 518 $O_5$ | Sushi at Plano | (0,9) | 25 |
| 520 $O_6$ | Shanghai Cafe | (41,2) | 500 |
| 522 $O_7$ | Starbucks | (32,8) | 100 |
| 524 $O_8$ | Super China Buffet | (42,5) | 100 |
| 526 $O_9$ | Staples | (45,12) | 300 |
| 528 $O_{10}$ | Starbucks | (35,0) | 100 |

FIG. 5

PROGRESSIVE SPATIAL SEARCHING USING AUGMENTED STRUCTURES

CROSS-REFERENCE TO RELATED APPLICATION

This application is a divisional of, and claims benefit from, commonly assigned, U.S. patent application Ser. No. 12/981,082, U.S. Pat. No. 8,930,391, with inventors Kaushik Chakrabarti et al., filed Dec. 29, 2010, entitled "Progressive Spatial Searching Using Augmented Structures," the entirety of which is incorporated by reference herein.

BACKGROUND

Searching databases has become a routine functionality that may be used many times each day by users of devices such as desktop computers, personal computers and handheld devices such as mobile phones and global positioning system (GPS) devices. Customers of such devices may make purchasing decisions based on reviews of retrieval times for searches, as well as for quality of relevance of search results returned in response to search queries. Thus, it may be desirable to provide faster and more efficient techniques for searching. For example, in order to speed up search functionality, some search engines may provide suggested result strings as a user types in a character string. For example, as an autocompletion, a search engine for text strings may suggest strings such as "Starbucks" or "Staples" as a user enters a prefix character substring "Sta" as part of an intended complete string of "Starbucks." As another example, a user may enter "Sta" and a type-ahead search engine may similarly suggest strings such as "Starbucks" or "Staples" on-the-fly, as the user types. The user may then select the suggested string "Starbucks" to obtain more information for that string, without entering the complete string, thus saving the time of entering all the characters of the complete string.

GPS devices may provide information regarding a user's current location, as well as information regarding entities that may be "close" in geographic proximity to the user's current location. For example, a user may request information for finding a "closest" proximity Starbucks by entering the string "Starbucks" and requesting a search. The GPS device may then search for a match on the string and provide a list of Starbucks stores, sorted in decreasing order of proximity to the user's current location. Thus, the GPS device may provide a list of stores that are located, for example, one mile, two miles, three miles, and four miles, respectively, from the user's current location. The list of stores may be displayed either as a text listing, or as a geographic oriented display indicating the locations of the stores in relation to the user's current location. The user may then select one of the stores to obtain navigation information for travelling to the selected store. The GPS device may then provide an estimation of an arrival time or a distance to be travelled by the user to reach the selected store, as well as other information associated with the selected store, such as a telephone number.

SUMMARY

According to one general aspect, a progressive spatial search engine may include a location determination engine configured to determine a location associated with a user of a computing device and a prefix string receiving engine configured to receive a prefix portion of an input string as one or more successive characters of the input string are provided by the user via the computing device. The progressive spatial search engine may also include a suggestion engine configured to obtain, via a searching device processor, a list of suggested items associated with valid string completions of the prefix portion, based on a function of respective recommendation indicators and proximities of the items to the location in response to receiving the prefix portion of the input string, and based on partially traversing a character string search structure having a plurality of non-terminal nodes augmented with bound indicators associated with spatial regions. The progressive spatial search engine may also include a rendering engine configured to return to the user the list of suggested items and descriptive information associated with each suggested item, in response to receiving the prefix portion, for rendering an image illustrating indicators associated with the list of suggested items in a manner relative to the location, as the user provides each successive character of the input string.

According to another aspect, a character string search structure may be generated that includes an initial node and a plurality of internal nodes included in string paths from the initial node to terminal nodes, each string path representing a valid character string. At least one retrieval item may be stored in a computing device storage area associated with each terminal node, wherein the retrieval item includes an item location indicator and a recommendation indicator associated with the retrieval item. A cardinality of augmented non-terminal nodes for storing spatial bound indicators indicating bounds of sub-structures of the character string search structure that emanate from the augmented non-terminal nodes may be determined. A set of augmented non-terminal nodes may be determined based on comparing a benefit value of each augmented non-terminal node with a benefit value of an ancestor node of the augmented non-terminal node in the character string search structure, based on a benefit function of nodes and having the determined cardinality. Spatial bound values associated with spatial regions represented by each of the augmented non-terminal nodes included in the set may be determined, based on comparing error values of bounds associated with a first non-terminal node spatial region with error values of bounds associated with spatial regions associated with nodes that are descendants of the first non-terminal node, and each spatial bound value may be stored in association with the respective associated augmented non-terminal node.

According to another aspect, a computer program product tangibly embodied on a computer-readable medium may include executable code that, when executed, is configured to cause at least one data processing apparatus to receive successive input characters of a character string provided by a user of a first computing device via a user interface, generate a prefix portion of the input string based on a character most recently provided by the user, and send a request for a search of a character string search structure having a plurality of non-terminal nodes augmented with bound indicators associated with spatial regions to a second computing device, in response to receiving each of the successive input characters, the request including the prefix portion and a location associated with the user. Further, the data processing apparatus may receive a list of suggested items and descriptive information associated with each of the suggested items in response to the request, as the user provides additional successive characters of the input string, and may render an image illustrating the descriptive information and the list of suggested items in a manner relative to the location, as the user provides each successive character of the input string.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 5 illustrates example objects and information associated with the objects of an example database.

DETAILED DESCRIPTION

Figure 1A:
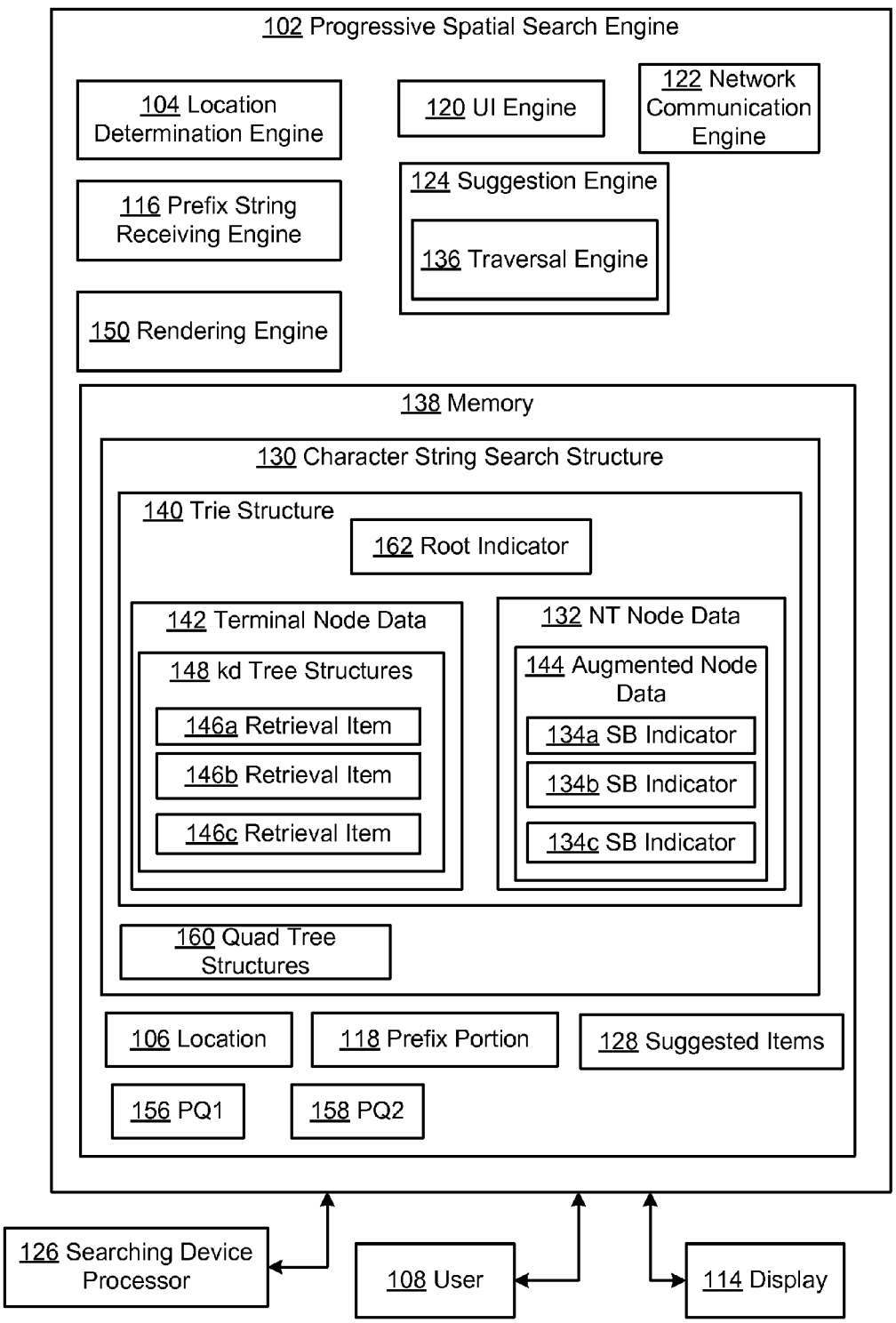
FIGS. 1a-1c are block diagrams of example systems for progressive spatial searching.

Spatial databases such as yellow page databases may be searched using keywords. For example, a user may wish to search for a coffee shop such as Starbucks or a Chinese restaurant from a mobile phone. As discussed herein, the yellow page system may be "location-aware," in that spatial objects of the database may be ranked by relevance to the user's keyword query and by their proximity to the user's location. Typing the entire query may be cumbersome for the user and prone to errors, especially from mobile phones.

Techniques described herein may be used, for example, to provide progressive, or type-ahead search functionality for spatial databases. Like keyword search on spatial data, such progressive searching, as described herein, may be location-aware. According to an example embodiment, with every character being typed or otherwise provided by the user, a progressive search system may provide to the user spatial objects whose names or descriptions are valid completions of a query string typed so far and which rank highest in terms of proximity and other criteria such as predetermined scores. For example, the user may also desire criteria such as popularity and ratings of businesses to be considered in a ranking technique for returning results of a search.

While many searches are conducted from personal computers, users have been increasingly using mobile devices to perform searches. For example, a user may wish to find a nearby Starbucks or gas station on-the-go, and may request a search from a mobile device such as a smart phone. Since typing an entire query may be cumbersome and susceptible to errors, an example progressive search engine as discussed herein may greatly improve the user's search experience by progressively presenting information regarding relevant businesses as the user types in the query.

As an example, a user may wish to locate a nearby Starbucks while travelling as an automobile passenger on a highway. The user may begin entering a character string on a GPS-equipped mobile device, and may have typed the prefix string "star" in the process of entering the string "Starbucks". The user's current location may be obtained (e.g., if the user is in range of GPS signals), and the prefix string "star" may be sent to a search engine with the current location information. According to an example embodiment, the search engine may receive the location information and the prefix string, and may return to the user a set of database objects as suggested items that match a completion of the query string, ranked in order of a function of proximity to the location information and other desired criteria, as the user is entering each new character of the query string. Thus, for example, as the user enters "star" the search engine may return the address and phone number of the nearest Starbucks (and similar information for other returned objects), potentially saving the user from typing in the rest of the query string.

Therefore, according to an example embodiment, with every character being typed or otherwise provided by the user, a search technique as described herein may return spatial objects as suggested items whose names (or descriptions) are valid completions of the query string typed or provided so far by the user, and which are closest to the user's location as of entry of the last character provided. Since the location information may vary as the user moves during character entry (e.g., by moving in a car while requesting information regarding Starbucks), the search technique may return different results for progressive searches as each successive character is provided (e.g., the user may move closer to one Starbucks while moving away from another Starbucks that may have been returned in response to an earlier prefix string search request).

As further discussed herein, FIG. 1 is a block diagram of a system 100 for searching structures augmented with spatial data using prefix strings of string queries and returning database retrieval items or objects as the query is being provided to the system.

Figure 1B:
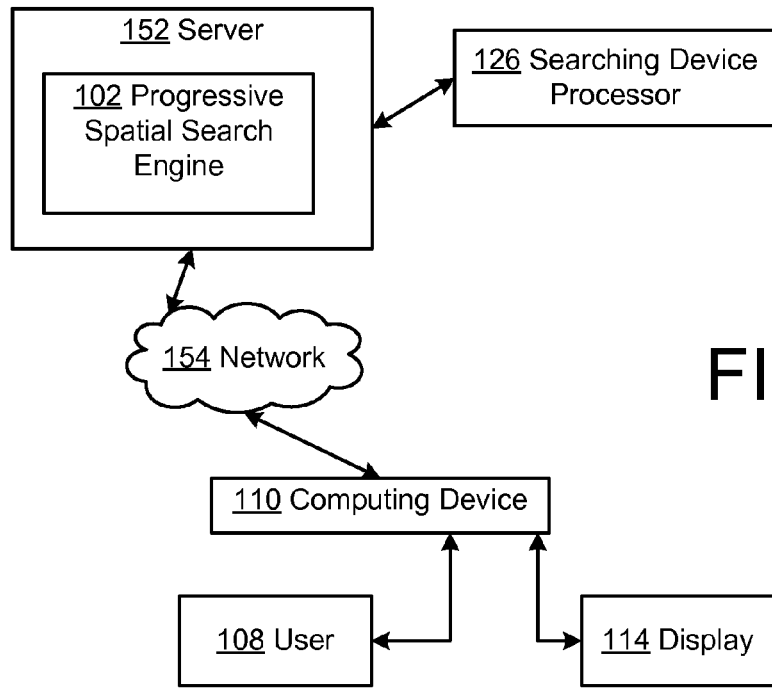
Figure 1C:
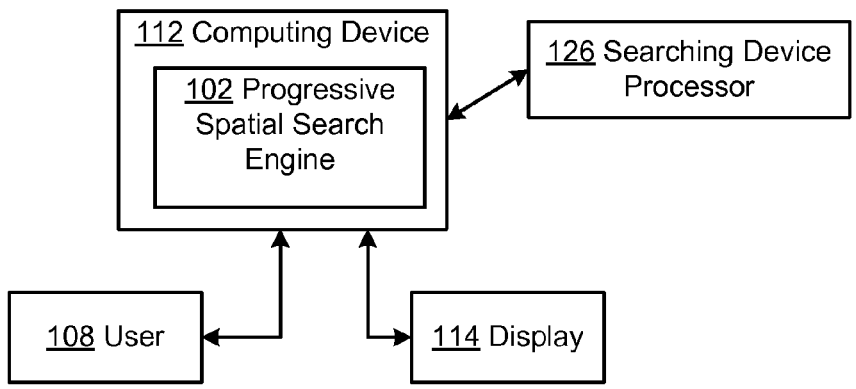

As shown in FIGS. 1a-1c, a progressive spatial search engine 102 may include a location determination engine 104 that may be configured to determine a location 106 associated with a user 108 of a computing device 110, 112. For example, the computing device 110, 112 may include GPS functionality that may provide geographic coordinates for determining the location 106. As another example, the user 108 may provide location information, or the location 106 may be determined based on a port address on a network. The location 106 may also be determined from an analysis of wireless station locations if the computing device 110, 112 is utilizing wireless communications. For example, a display 114 may provide a visual, audio, and/or tactile medium for the user 108 to monitor his/her input to and responses from the progressive spatial search engine 102. For example, the user 108 may provide input via a touchpad, a touchscreen, a keyboard or keypad, a mouse device, a trackball device, or an audio input device or other input sensing device. For example, the user 108 may speak information for voice recognition processing to character format.

A prefix string receiving engine 116 may be configured to receive a prefix portion 118 of an input string as one or more successive characters of the input string are provided by the user 108 via the computing device 110, 112. A user interface engine 120 may be configured to manage communications between the user 108 and the progressive spatial search engine 102. A network communication engine 122 may be configured to manage network communication between the progressive spatial search engine 102 and other entities that may communicate with the progressive spatial search engine 102 via one or more networks.

A suggestion engine 124 may be configured to obtain, via a searching device processor 126, a list of suggested items 128 associated with valid string completions of the prefix portion, based on a function of respective recommendation indicators and proximities of the suggested items 128 to the location 106 in response to receiving the prefix portion 118 of the input string, and based on partially traversing a character string search structure 130 having a plurality of non-terminal nodes 132 augmented with bound indicators 134 associated with spatial regions. According to an example embodiment, the suggestion engine 124 may include a traversal engine 136 configured to traverse the character string search structure 130. According to an example embodiment, the traversal engine 136 may be configured to partially traverse the character string search structure along a path of one or more nodes matching successive characters of the prefix portion to determine a query-match node (QMN) of the character string search structure associated with the prefix portion, wherein partial traversal is based on pruning sub-structures of the character string search structure from traversal based on a function of the location associated with the user and the bound indicators of the augmented non-terminal nodes.

In this context, pruning a sub-structure from traversal may include avoiding traversal of a sub-structure such as a subtree, based on one or more descisions that may be made at non-terminal nodes, thereby saving at least the processing costs associated with visiting nodes included in the pruned sub-structure.

In this context, a "processor" may include a single processor or multiple processors configured to process instructions associated with a processing system. A processor may thus include multiple processors processing instructions in parallel and/or in a distributed manner.

According to an example embodiment, a dynamically accessible memory 138 may be configured to store the character string search structure 130 having the plurality of non-terminal nodes 132 augmented with bound indicators 134a, 134b, 134c associated with spatial regions. According to an example embodiment, the augmented non-terminal nodes are a subset of non-terminal nodes of the character string search structure, the augmented non-terminal nodes selected for augmentation based on adaptive selection of the spatial regions associated with the bound indicators. In this context, a "memory" may include a single memory device or multiple memory devices configured to store data and/or instructions.

For example, the character string search structure 130 may include a trie structure 140 that includes both terminal nodes (e.g., leaf nodes) that include terminal node data 142 and the non-terminal nodes 132 (e.g., internal nodes) that include augmented node data 144. For example, the trie structure 140 may include non-terminal nodes 132 that represent characters of character strings, such that a path from a root, or initial node, of the trie structure 140 to one of the terminal nodes 142 may represent a valid character string. According to an example embodiment, the terminal node data 142 may include retrieval items 146a, 146b, 146c. For example, the retrieval items 146a, 146b, 146c may include objects associated with the character strings, the objects including retrieval item information such as the associated string, an identifier, descriptive information associated with the objects, and recommendation information. According to an example embodiment, the trie structure 140 may also include one or more non-terminal nodes 132 that are not augmented with bound indicators 134a, 134b, 134c associated with spatial regions.

According to an example embodiment, the terminal node data 142 may be stored in kd tree structures 148. For example, the objects may be stored in terminal nodes of kd tree structures, and pointers to the kd tree structures may be stored in the terminal node data 142 of the trie structure 140.

In this context, one skilled in the art of data processing will understand that a trie structure generally may include a tree structure for storing strings in which there is one internal, or non-terminal node for every common prefix, wherein the strings are stored in terminal, or leaf nodes. In general, a string may include character strings, bit strings, or any other type of successive-entity list. One skilled in the art of data processing will further understand that there may exist many variations on the general trie structure. For example, a Patricia tree may include a compact representation of a trie in which any node that is an only child is merged with its parent. According to an example embodiment, the trie structure 140 may include a Patricia tree.

In this context, one skilled in the art of data processing will understand that a kd tree structure generally may include a multidimensional search tree for points in k dimensional space wherein levels of the tree may be split along successive dimensions at the points.

In this context, one skilled in the art of data processing will further understand that multidimensional space may include hyperspaces other than Euclidean space, and it is not intended that any of the techniques discussed herein be limited to Euclidean space. For example, a database object such as a commercial product may include attributes associated with it, such as a color, size, name, inventory number, and popularity ranking. Thus, the product may be represented as a point in 5-space, based on values assigned to each of the attributes color, size, name, inventory number, and popularity ranking. The "location" of the product in 5-space may then be represented as a 5-tuple (color, size, name, inventory number, popularity ranking), and its proximity to (or distance from) other products may be determined via various metrics defined on the product space associated with the database that includes the product. Distances and proximities may thus be determined via many different aggregation functions, as discussed further herein. For example, a parts database may be designed for searching for particular parts or close substitutes for the particular parts. As another example, a person may similarly be represented as a point in 8-space, based on values assigned to each of the attributes color, size, name, social security number, eye color, blood type, age, and popularity ranking. An example database may be designed for searching for people for invitations to a medical trial, based on proximities to an aggregation of particular attributes associated with a medical study.

A rendering engine 150 may be configured to return to the user 108 the list of suggested items 128 and descriptive information associated with each suggested item, in response to receiving the prefix portion 118, for rendering an image illustrating indicators associated with the list of suggested items 128 in a manner relative to the location, as the user 108 provides each successive character of the input string. According to an example embodiment, the suggested items are associated with a yellow pages database including information associated with businesses. In this context, the yellow pages database may represent a listing of businesses with descriptive information such as business name, type or category of business, address, telephone number, email address, web page address or other contact information, popularity or rating scores, and advertising materials.

According to an example embodiment, the progressive spatial search engine 102 may be located on the computing device 112 associated with the user 108 or on a server 152 that is in communication with the computing device 110 via a network 154. For example, the computing device 110, 112 may include a personal computer or mobile device such as a smart phone.

According to an example embodiment, the location determination engine 104 may be configured to determine the location 106 associated with the user 108 based on receiving geographic coordinates associated with a current geographic placement of the user 108. According to an example embodiment, the location determination engine 104 may be configured to determine the location 106 associated with the user 108 based on receiving location information specified by the user 108 or provided automatically by the computing device 110, 112. According to an example embodiment, the user may provide attribute information the represents the location 106 associated with the user 108 (e.g., product attributes as discussed above).

According to an example embodiment, the list of suggested items 128 may include a list of objects that include sets of attributes associated with respective objects in the list, wherein each object is associated with a label having a label prefix matching a current prefix portion 118 of the input string. According to an example embodiment, the label prefix may include a name associated with the object or a descriptive term associated with the object. For example, the label prefix may include a name such as "Starbucks" or a descriptive term such as "coffee".

According to an example embodiment, the suggestion engine 124 may be configured to generate the list of suggested items 128 based on determining proximities of the suggested items 128 to the location 106 in response to receiving the prefix portion 118 from the prefix string receiving engine 116, and based on traversing the trie structure 140 augmented with spatial bound indicators 134a, 134b, 134c associated with spatial regions represented by non-terminal nodes 132 of the character string search structure 130, wherein the trie structure 140 is included in the character string search structure 130.

According to an example embodiment, the rendering engine 150 may be configured to render the image illustrating indicators associated with respective elements of the list of suggested items in a manner relative to the location 106, as the user 108 provides each successive character of the input string. The indicators may include one or more of a geographic address, a contact telephone number, a geographic distance from the location associated with the user, a popularity rating, a recommendation rating, and a name of an entity associated with each element.

According to an example embodiment, the rendering engine 150 may be configured to render the indicators as one of a ranked listing and a geographic display indicating geographic locations of the respective elements relative to the location 106 associated with the user 108, wherein the ranked listing is based on a ranking function that is based on the location 106 associated with the user, a location associated with each suggested item, and one or more of a popularity indicator and a rating indicator associated with each suggested item.

According to an example embodiment, the suggestion engine 124 may include the traversal engine 136 configured to partially traverse the character string search structure 130 along a path of one or more nodes matching successive characters of the prefix portion 118 to determine a query-match node (QMN) of the character string search structure 130 associated with the prefix portion 118, and traverse a further first path of the character string search structure 130 from the QMN in a depth first search manner until reaching a first materialized node that includes information associated with node items that satisfy queries that include the prefix portion 118.

According to an example embodiment, the suggestion engine 124 may be configured to determine whether the first materialized node is a terminal node 142 of the character string search structure 130. If the first materialized node is determined to be a terminal node 142, the suggestion engine 124 may compare ranking values associated with the node items with ranking values associated with first priority queue items currently included in a first priority queue 156, and select a predetermined total number of the compared items, based on results of the comparing of the ranking values. The suggestion engine 124 may then update the first priority queue 156 to include the selected compared items, as discussed further below.

If the first materialized node is determined to be an augmented non-terminal node 132, the suggestion engine 124 may update a second priority queue 158 to include a bound indicator 134 associated with the non-terminal node.

The suggestion engine 124 may select a most significant one of the bound indicators included in the second priority queue 158, compare the most significant bound indicator with a most significant ranking value associated with one of the first priority queue items 156, and generate the list of suggested items 128 based on a result of comparing the most significant bound indicator with the most significant ranking value.

According to an example embodiment, the traversal engine 136 may be configured to traverse a further second path of the character string search structure 130 from the first materialized node in a depth first search manner until reaching a second materialized node that includes information associated with node items that satisfy queries that include the prefix portion 118, if the first materialized node is determined to be an augmented non-terminal node 132 and the most significant bound indicator is determined to be less significant than the most significant ranking value based on the comparison, as discussed further below.

According to an example embodiment, the bound indicators 134a, 134b, 134c may include indicators identifying nodes that are included in quad tree structures 160. For example, the bound indicators 134a, 134b, 134c may include numeric-format indicators that encode nodes of quad trees 160, as discussed further below.

In this context, one skilled in the art of data processing will understand that a quad tree structure generally may include a search tree for points in k dimensional space wherein each node is split along all k dimensions, such that each non-terminal node may have $2^k$ children. For example, if k=2, each non-terminal node (e.g., internal node) may have exactly four children. For example, a quad tree structure may be used to partition a two dimensional space by recursively subdividing it into four quadrants or regions. The regions may be square or rectangular, or may have other shapes devised by a user.

According to an example embodiment, the character string search structure 130 may include a root indicator 162 that may include an initial node for searching the trie structure 140. For example, the root indicator 162 may include information that indicates addresses of child nodes of a root or initial node for beginning a traversal of the trie structure 140.

Figure 2:
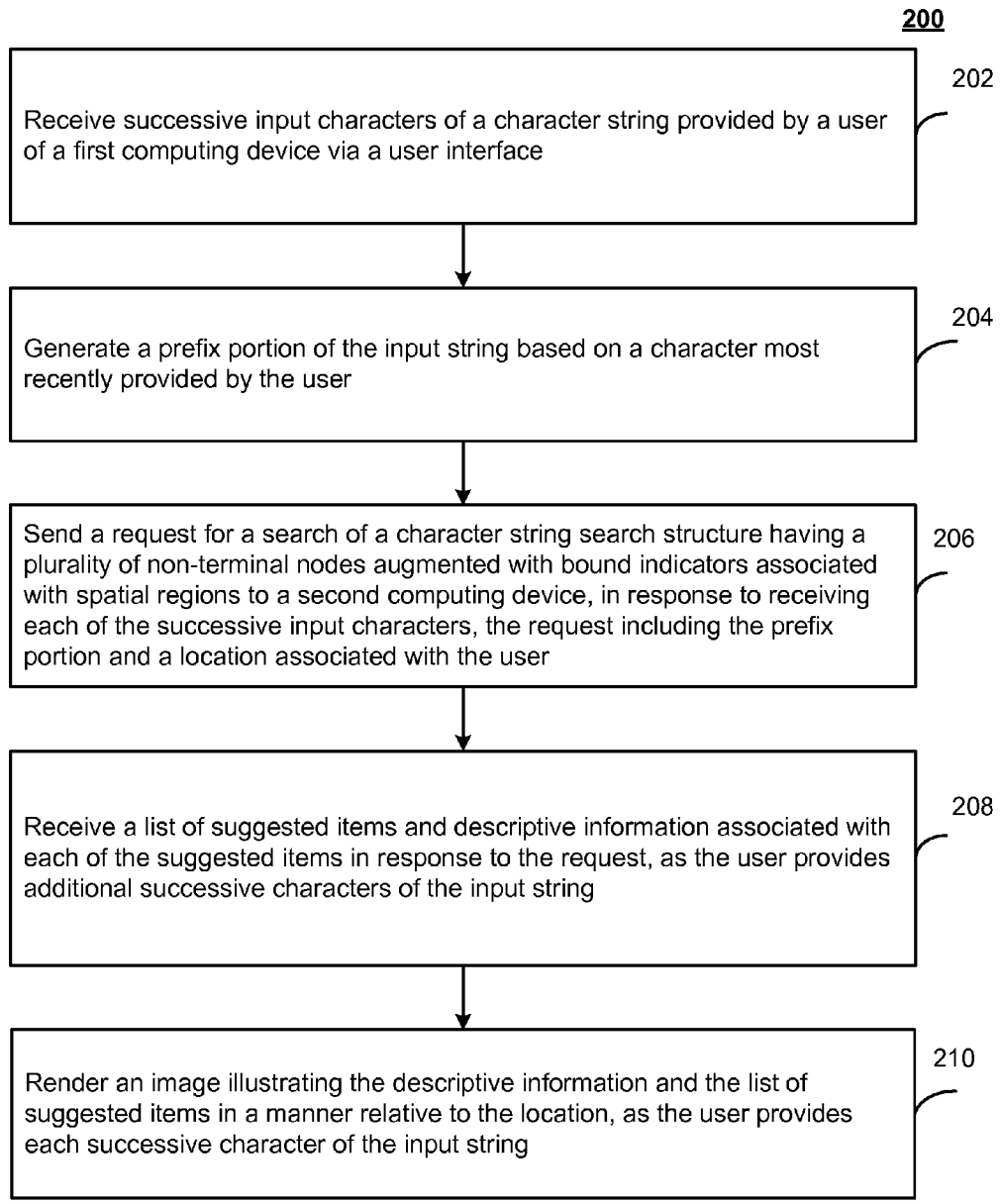
FIG. 2 is a flowchart illustrating example operations of the system of FIGS. 1a-1c.

FIG. 2 is a flowchart 200 illustrating example operations of the system of FIGS. 1a-1c. In the example of FIG. 2, successive input characters of a character string provided by a user of a first computing device via a user interface may be received (202). For example, the user 108 may provide input characters of a character string via the computing device 110. A user interface (e.g., the user interface engine 120) may manage the communication between the user 108 and the computing device 110.

A prefix portion of the input string may be generated based on a character most recently provided by the user (204). For example, the prefix portion 118 discussed above may be generated as a current prefix portion with each newly provided character from the user 108.

A request may be sent for a search of a character string search structure having a plurality of non-terminal nodes augmented with bound indicators associated with spatial regions to a second computing device, in response to receiving each of the successive input characters, the request including the prefix portion and a location associated with the user (206). For example, the computing device 110 may send the request for the search of the character string search structure 130 to the server 152, in response to receiving each newly provided character from the user 108. For example, the user 108 may provide information identifying the location 106, or the location 106 may be determined by the computing device 110, 112, for example, based on a network address, or via a GPS device locator or other type of device locator.

A list of suggested items and descriptive information associated with each of the suggested items may be received in response to the request, as the user provides additional successive characters of the input string (208). For example, the list of suggested items 128 may be received from the server 152 in response to the request, as the user 108 provides each additional character of the input string.

An image illustrating the descriptive information and the list of suggested items in a manner relative to the location may be rendered, as the user provides each successive character of the input string (210). For example, the rendering engine 150 may provide information for rendering an image on the display 114.

According to an example embodiment, the image may be rendered illustrating indicators associated with respective elements of the list of suggested items in a manner relative to the location, as the user 108 provides each successive character of the input string, wherein the indicators include one or more of a geographic address, a contact telephone number, a geographic distance from the location associated with the user, a popularity rating, a recommendation rating, and a name of an entity associated with each element.

According to an example embodiment, the indicators may be rendered as one of a ranked listing and a geographic display indicating geographic locations of the respective elements relative to the location 106 associated with the user 108.

According to an example embodiment, the requested search may include a determination of proximities of the suggested items 128 to the location 106 in response to receiving each character of the prefix portion, based on at least a partial traversal of a trie structure (e.g., trie structure 140) augmented with spatial bound indicators (e.g., spatial bound indicators 134) associated with spatial regions represented by non-terminal nodes 132 of the character string search structure 130. The trie structure 140 may be included in the character string search structure 130, and the list of suggested items 128 may include a list of objects that include sets of attributes associated with respective objects in the list, wherein each object is associated with a label having a label prefix matching a current prefix portion of the input string. For example, the trie structure may include the trie structure 140 discussed above, which may be included in the character string search structure 130.

Figure 3:
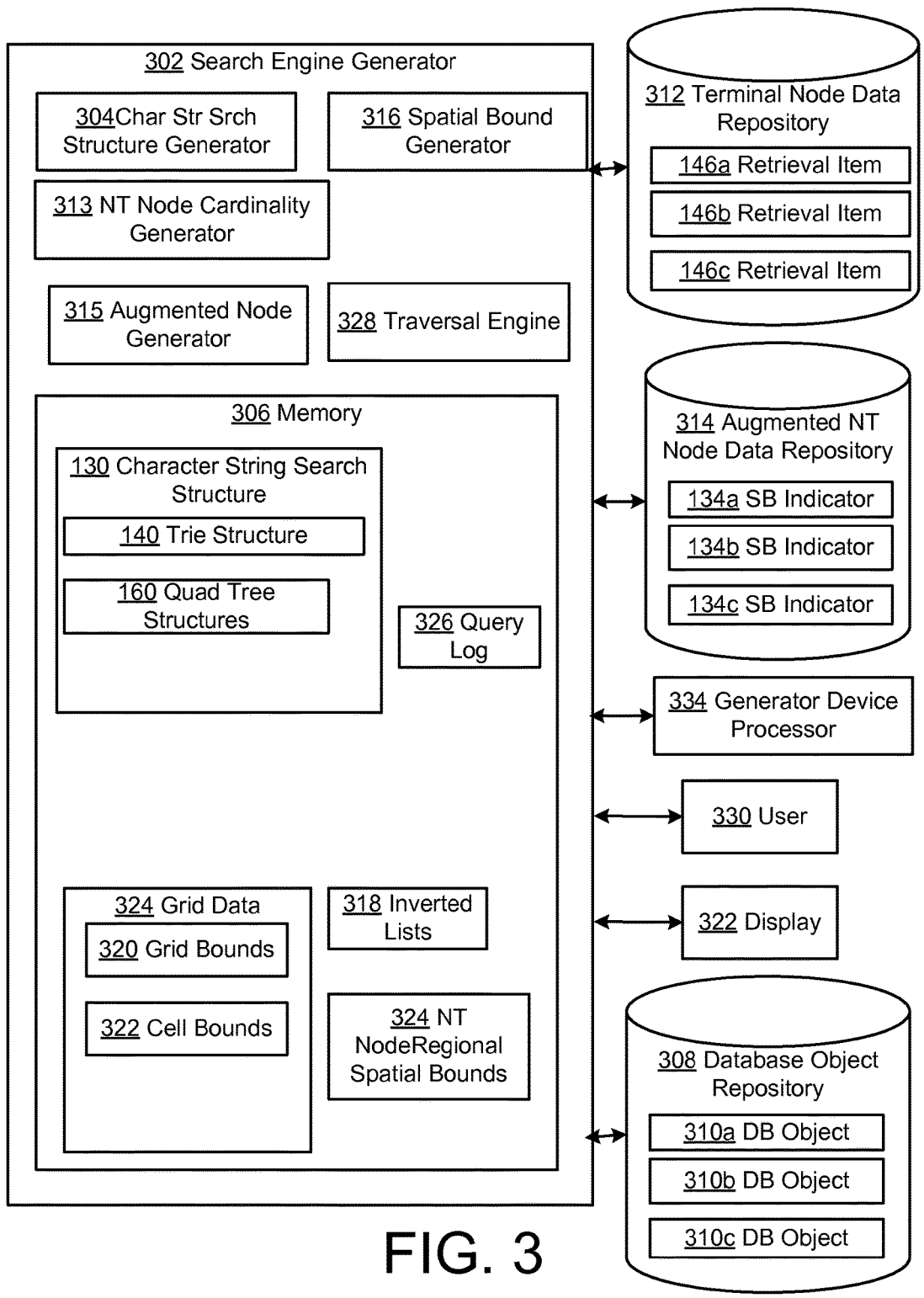
FIG. 3 is a block diagram of an example system for generating a search engine for progressive spatial searching.

FIG. 3 is a block diagram of an example system 300 for generating a search engine for progressive spatial searching. For example, the system 300 may be used to generate the progressive spatial search engine 102 discussed above.

According to an example embodiment, a search engine generator 302 may include a character string search structure generator 304 configured to generate the character string search structure 130 discussed above with regard to FIGS. 1a-1c. According to an example embodiment, the character string search structure 130 may include the root indicator 162 (e.g., an initial node) and a plurality of non-terminal nodes 132 (e.g., internal nodes) included in string paths from the root indicator 162 to terminal nodes 142, each string path representing a valid character string.

The search engine generator 302 may include a memory 306 that may be configured to store retrieval items 146a, 146b, 146c (included in the trie structure 140). According to an example embodiment, each retrieval item 146a, 146b, 146c may include an item location indicator and a recommendation indicator associated with the retrieval item. According to an example embodiment, a database object repository 308 may be configured to store database objects 310a, 310b, 310c that may be represented by strings in the character string search structure 130.

According to an example embodiment, a terminal node data repository 312 may be configured to store retrieval items 146a, 146b, 146c that may be represented by strings in the character string search structure 130, as the character string search structure is generated. According to an example embodiment, an augmented non-terminal node data repository 314 may be configured to store spatial bounds 316a, 316b, 316c that may be associated with spatial regions.

A non-terminal node cardinality generator 313 may be configured to determine a cardinality of augmented non-terminal nodes 132 for storing spatial bound indicators 134a, 134b, 134c indicating bounds of sub-structures of the character string search structure 130 that emanate from the augmented non-terminal nodes 132, as discussed further below.

An augmented node generator 315 may be configured to determine a set of augmented non-terminal nodes 132 based on comparing a benefit value of each augmented non-terminal node 132 with a benefit value of an ancestor node of the augmented non-terminal node 132 in the character string search structure 130, based on a benefit function of nodes and having the determined cardinality, as discussed further below.

A spatial bound generator 316 may be configured to determine spatial bound values 134 associated with spatial regions represented by each of the augmented non-terminal nodes 132 included in the set, based on comparing error values of bounds associated with a first non-terminal node spatial region with error values of bounds associated with spatial regions associated with nodes that are descendants of the first non-terminal node, as discussed further below. According to an example embodiment, the spatial bound generator 316 may store each spatial bound value 134 in association with the respective associated augmented non-terminal node 132. For example, the spatial bound indicators 134a, 134b, 134c may be stored in the augmented non-terminal node data repository 314 as the character string search structure 130 is generated. The spatial bound indicators 134a, 134b, 134c may be stored in the non-terminal node data 132 when the character string search structure 130 is to be used for searching.

According to an example embodiment, the benefit function of a node may include a function of a sum of ratios of expected bound indicators associated with expected bound indicators of ancestors of the node and an expected bound indicator associated with the node, multiplied by a value indicating a saved cost of processing associated with search terminations at materialized non-terminal nodes of the character string search structure, in accordance with $$\text{Benefit}(\mathcal{M}) = \sum_{(\forall n_\tau \in \mathcal{M})} \text{Benefit}(n_\tau, \mathcal{M}), \text{ and}$$

$$\text{Benefit}(n_\tau, \mathcal{M}) = \sum_{(\forall n'_\tau)} \frac{(\text{Expected-Score-bound}(n'_\tau))}{(\text{Expected-Score-bound}(n_\tau))} \times \text{CostSave}(n_\tau)$$

such that $n'_\tau$ is an ancestor of node $n_\tau$,
wherein
$\mathcal{M}$ indicates a set of non-terminal nodes of a the character string search structure,
$n_\tau$ indicates a non-terminal node of the character string search structure,
Expected-Score-bound $(n'_\tau)$ indicates an approximated k-th largest ranking value associated with $n'_\tau$,
Expected-Score-bound $(n_\tau)$ indicates an approximated k-th largest ranking value associated $n_\tau$, and $$\text{CostSave}(n_\tau) = QPCost(n_\tau) - \Sigma_{\forall MFr(n_\tau)} QPCost(MFr(n_\tau)),$$

wherein
$QPCost(n_\tau)$ denotes a query processing cost associated with the non-terminal node $n_\tau$, based on a cost of links traversed and a cost of determining ranking values, and
$QPCost(MFr(n_\tau))$ denotes a query processing cost associated with a non-terminal node selected as a materialized frontier of the non-terminal node $n_\tau$, wherein the materialized frontier includes one or more nearest materialized descendant nodes of $n_\tau$,
as discussed further below.

According to an example embodiment, the augmented node generator 315 may be configured to randomly select an initial group of non-terminal nodes based on random selection, and converge to the set of augmented non-terminal nodes based on a hill-climbing result that corresponds to a most significant benefit resulting from a plurality of iterations of a hill-climbing search, as discussed further below.

According to an example embodiment, the character string search structure 130 may include a trie structure 140 that includes at least one of quad tree structures 160 and kd tree structures 148 associated with one or more nodes included in the character string search structure 130.

According to an example embodiment, the spatial bound generator 316 may be configured to generate a plurality of ordered inverted lists 318 associated with coordinate values associated with dimensionalities associated with the location 106 and with recommendation indicators associated with the retrieval items 146a, 146b, 146c, and to determine spatial grid bounds 320 associated with a grid representing a spatial area that includes the locations of retrieval items 146a, 146b, 146c associated with the terminal nodes 142 of the character string search structure 130. For example, the grid may represent a spatial area that includes spatial representations of locations of all database objects 310 that are stored in the database object repository 308.

According to an example embodiment, the spatial bound generator 316 may be configured to determine spatial cell bounds 322 associated with a plurality of cells included in the grid, to determine a minimum distance between one of the retrieval items 146a, 146b, 146c and one of the cells based on a function of coordinate values associated with the item location indicator associated with the retrieval item and coordinate values associated with the spatial cell bound associated with the cell, and to determine spatial bound values 134 associated with spatial regions represented by each of the augmented non-terminal nodes included in the set, based on comparing error values of bounds associated with a first non-terminal node spatial region with error values of bounds associated with spatial regions associated with nodes that are descendants of the first non-terminal node, wherein error values of bounds associated with spatial regions are represented via nodes associated with quadtrees and are minimized based on selecting frontiers of the quadtrees that minimize the error values of bounds associated with spatial regions, as discussed further below.

According to an example embodiment, the spatial bound generator 316 may be configured to determine the spatial cell bounds 322 associated with a plurality of cells included in the grid based on a threshold aggregation function of the values included in the ordered inverted lists 318, as discussed further below. For example, the ordered inverted lists 318 may include a list of coordinate values of each database object 310 for each dimensionality of the database, sorted in increasing order, as well as a list of recommendation indicators for each database object 310 stored in the database object repository, sorted in decreasing order by recommendation value. Thus, if the database objects 310 are two-dimensional and have a static score as a recommendation indicator, then the ordered inverted lists 318 may include an ordered list of x-coordinate values, and ordered list of y-coordinate values, and an ordered list of static scores, with one entry in each ordered list for each database object 310 in the database object repository 308.

According to an example embodiment, a grid data storage area 324 may be configured to store the spatial grid bounds 320 and the spatial cell bounds 322.

According to an example embodiment, a query log 326 may be configured to store a history of queries. According to an example embodiment, a traversal engine 328 may be configured to traverse, or partially traverse, the character string search structure 130 during its generation, as discussed further below.

According to an example embodiment, a user 330 may interact with the search engine generator 302, for example, for managing the generation of the character string search structure 130. For example, the user 330 may enter information such as the requested cardinality of the suggested items 128 to be returned to the user 108 of the progressive spatial search engine 102. The user 330 may receive information via a display device 332. According to an example embodiment, the character string structure generator 304 may generate the character string search structure 130 via a generator device processor 334.

Figure 4:
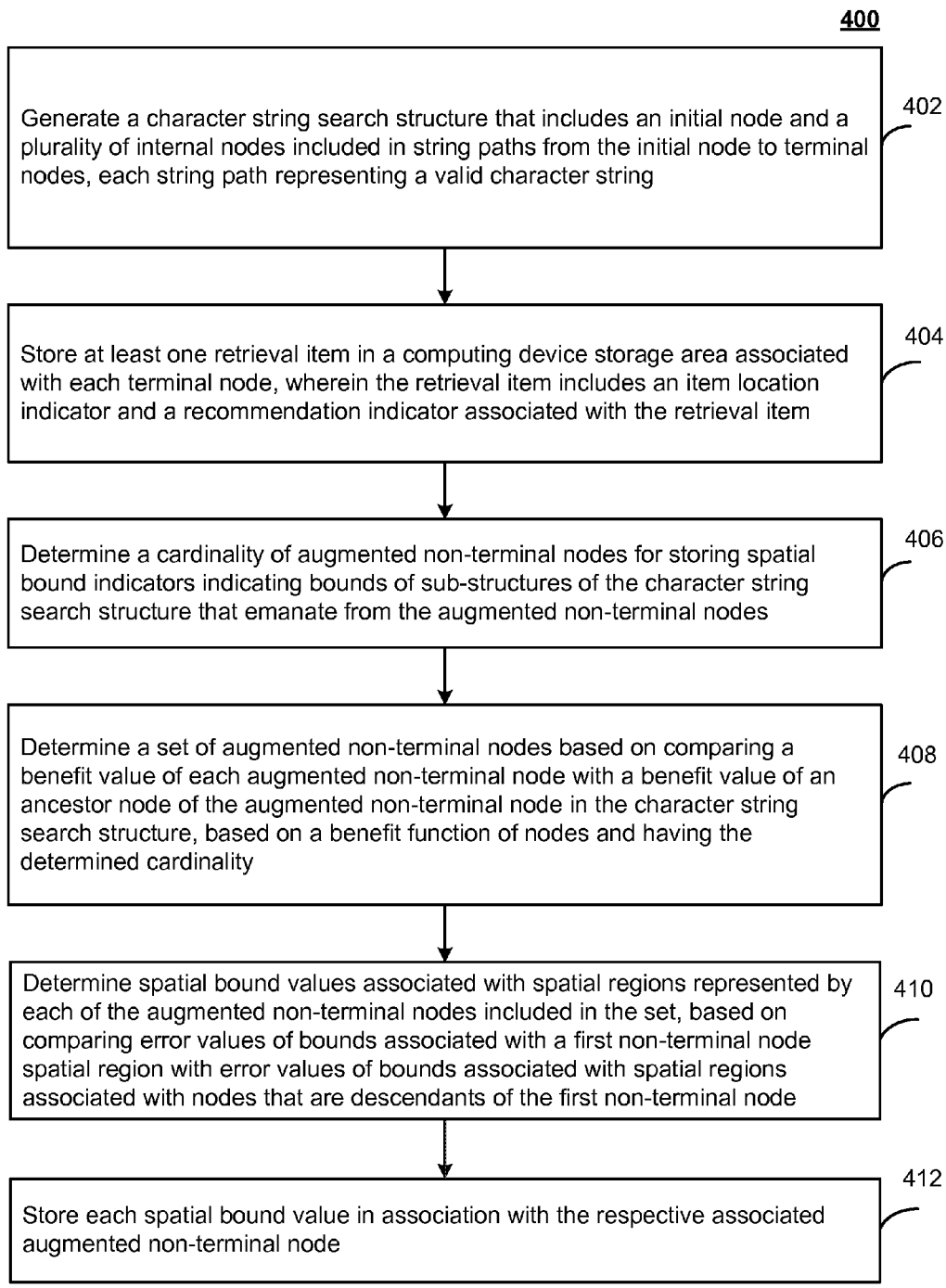
FIG. 4 is a flowchart illustrating example operations of the system of FIG. 3.

FIG. 4 is a flowchart 400 illustrating example operations of the system of FIG. 3. In the example of FIG. 4, a character string search structure may be generated (402). The character string search structure may include an initial node and a plurality of internal nodes included in string paths from the initial node to terminal nodes, each string path representing a valid character string. For example, the character string search structure generator 304 may generate the character string search structure 130. For example, the character string search structure 130 may include an initial node represented by the root indicator 162, internal nodes (e.g., non-terminal nodes 132) included in string paths from the initial node to terminal nodes 142, each string path representing a valid character string. For example, a valid character string may include strings represented by database objects 310 stored in the database object repository 308.

At least one retrieval item may be stored in a computing device storage area associated with each terminal node, wherein the retrieval item includes an item location indicator and a recommendation indicator associated with the retrieval item (404). For example, the retrieval items 146a, 146b, 146c may be stored in the terminal node data storage area 142 as discussed above. According to an example embodiment, the retrieval items 146a, 146b, 146c may be stored in the terminal node data repository 312 during generation of the character string search structure 130.

A cardinality of augmented non-terminal nodes for storing spatial bound indicators indicating bounds of sub-structures of the character string search structure that emanate from the augmented non-terminal nodes may be determined (406). For example, the non-terminal node cardinality generator 313 may determine a cardinality of augmented non-terminal nodes 132 for storing spatial bound indicators 134a, 134b, 134c indicating bounds of sub-structures of the character string search structure 130 that emanate from the augmented non-terminal nodes 132, as discussed further below.

A set of augmented non-terminal nodes may be determined based on comparing a benefit value of each augmented non-terminal node with a benefit value of an ancestor node of the augmented non-terminal node in the character string search structure, based on a benefit function of nodes and having the determined cardinality (408). For example, the augmented node generator 315 may determine the set of augmented non-terminal nodes 132 based on comparing a benefit value of each augmented non-terminal node 132 with a benefit value of an ancestor node of the augmented non-terminal node 132 in the character string search structure 130, based on a benefit function of nodes and having the determined cardinality, as discussed further below.

Spatial bound values associated with spatial regions represented by each of the augmented non-terminal nodes included in the set may be determined, based on comparing error values of bounds associated with a first non-terminal node spatial region with error values of bounds associated with spatial regions associated with nodes that are descendants of the first non-terminal node (410). For example, the spatial bound generator 316 may determine spatial bound values associated with spatial regions represented by each of the augmented non-terminal nodes 132, as discussed further below.

Each spatial bound value may be stored in association with the respective associated augmented non-terminal node (412). For example, the spatial bound values may be represented by the spatial bound indicators 134a, 134b, 134c that are stored in the augmented node data 144 and that may be stored in the augmented non-terminal node data repository 314 as the character string search structure 130 is generated.

According to an example embodiment, the benefit function of nodes may include a function of a sum of ratios of expected bound indicators associated with expected bound indicators of ancestors of the nodes and an expected bound indicator associated with the nodes, multiplied by a value indicating a saved cost of processing associated with search terminations at materialized non-terminal nodes of the character string search structure, as discussed further below.

According to an example embodiment, determining the set of augmented non-terminal nodes 132 may include randomly selecting an initial group of non-terminal nodes based on random selection, and converging to the set of augmented non-terminal nodes 132 based on a hill-climbing result that corresponds to a most significant benefit resulting from a plurality of iterations of a hill-climbing search, as discussed further below.

According to an example embodiment, the character string search structure may include a trie structure that includes at least one of quad tree structures and kd tree structures associated with one or more nodes included in the character string search structure. For example, the character string search structure 130 may include the trie structure 140 that includes at least one of quad tree structures 160 and kd tree structures associated with one or more nodes included in the character string search structure 130.

According to an example embodiment, determining spatial bound values may include generating a plurality of ordered inverted lists associated with coordinate values associated with dimensionalities associated with the location and with recommendation indicators associated with the retrieval items and determining spatial grid bounds associated with a grid representing a spatial area that includes the locations of retrieval items associated with the terminal nodes of the character string search structure. For example, the spatial bound generator 316 may generate the plurality of ordered inverted lists 318 and determine the spatial grid bounds 320 as discussed further herein.

According to an example embodiment, determining spatial bound values may include determining spatial cell bounds associated with a plurality of cells included in the grid, determining a minimum distance between one of the retrieval items and one of the cells based on a function of coordinate values associated with the item location indicator associated with the retrieval item and coordinate values associated with the spatial cell bound associated with the cell, and determining spatial bound values associated with spatial regions represented by each of the augmented non-terminal nodes included in the set, based on comparing error values of bounds associated with a first non-terminal node spatial region with error values of bounds associated with spatial regions associated with nodes that are descendants of the first non-terminal node. For example, the spatial bound generator 316 may determine the spatial cell bounds 322, determine the minimum distance between one of the retrieval items 146a, 146b, 146c and one of the cells based on a function of coordinate values associated with the item location indicator associated with the retrieval item and coordinate values associated with the spatial cell bound associated with the cell, and determine the spatial bound values 134, as discussed further below.

According to an example embodiment, determining the spatial cell bounds may include determining spatial cell bounds associated with a plurality of cells included in the grid based on a threshold aggregation function of the values included in the ordered inverted lists. For example, the spatial bound generator 316 may determine the spatial cell bounds 322 based on the threshold aggregation function of the values included in the ordered inverted lists 318, as discussed further below.

FIG. 5 illustrates example objects and information associated with the objects of an example database. For example, the objects and information may be represented by the database objects 310 stored in the database object repository 308, as well as by the retrieval items 146 stored in association with the terminal node data 142 discussed above. According to an example embodiment, the spatial database 500 may include database objects 310 that include, at least, names and locations of businesses that users may wish to locate in a search operation. As shown in the example of FIG. 5, each database object may include an identifier value (ID) 502, a string 504, a location 506, and a static score 508. For example, the ID 502 may include a unique identifier for each individual database object, for storage and retrieval of that particular database object.

According to an example embodiment, the string 504 may include a name of an entity such as one of the businesses or other landmark, or an attribute associated with an entity such as a business or other landmark. For example, a string value 504 such as "coffee" may be associated with coffee shops such as "Starbucks".

According to an example embodiment, the location may indicate a location of each database object, which may include coordinate values for the dimensionality of the database. For example, the locations 506 of FIG. 5 are represented as coordinates of points in 2-dimensional space. The static score 508 may represent a recommendation value or ranking value associated with each database object, as discussed further below.

The example spatial database 500 includes ten database objects 510-528 as shown. For example, a database object 510 includes an ID 502 value representing object $O_1$, a string value 504 indicating "Target", a location value 506 indicating (x,y) coordinate values (3,9), and a static score value indicated as "200." According to an example embodiment, the static scores 508 may represent popularity and ratings of the associated database objects. According to an example embodiment, the static scores 508 may be provided by a database administrator or by a recommendation indicator generator that tracks criteria such as popularity and ratings. According to an example embodiment, the recommendation indicators discussed above may be based on the static scores 508.

A database object 512 includes an ID 502 value representing object $O_2$, a string value 504 indicating "Thai Basil Leaf Restaurant", a location value 506 indicating (50,30), and a static score value indicated as "5." A database object 514 includes an ID 502 value representing object $O_3$, a string value 504 indicating "Sushi Rock", a location value 506 indicating (9,50), and a static score value indicated as "7." A database object 516 includes an ID 502 value representing object $O_4$, a string value 504 indicating "Shanghai Garden", a location value 506 indicating (38,5), and a static score value indicated as "10."

A database object 518 includes an ID 502 value representing object $O_5$, a string value 504 indicating "Sushi at Plano", a location value 506 indicating (0,9), and a static score value indicated as "25." A database object 520 includes an ID 502 value representing object $O_6$, a string value 504 indicating "Shanghai Cafe", a location value 506 indicating (41,2), and a static score value indicated as "500." A database object 522 includes an ID 502 value representing object $O_7$, a string value 504 indicating "Starbucks", a location value 506 indicating (32,8), and a static score value indicated as "100."

A database object 524 includes an ID 502 value representing object $O_8$, a string value 504 indicating "Super China Buffet", a location value 506 indicating (42,5), and a static score value indicated as "100." A database object 526 includes an ID 502 value representing object $O_9$, a string value 504 indicating "Staples", a location value 506 indicating (45,12), and a static score value indicated as "300." The tenth database object 528 includes an ID 502 value representing object $O_{10}$, a string value 504 indicating "Starbucks", a location value 506 indicating (35,0), and a static score value indicated as "100."

According to an example embodiment, more formally, if $\mathcal{D}$ is an example spatial database, each spatial object $O \in \mathcal{D}$ may be represented as a tuple (O.id, O.str, O.loc, O.sscore) where O.id indicates a unique id of the object, O.str indicates a string associated with the object (e.g., a label indicating a name of the object or a description associated with the object), O.loc indicates a location descriptor in multi-dimensional space and O.sscore indicates a static score associated with the object (for the current example database). For example, the example database 500 discussed above with regard to FIG. 5 includes database objects corresponding to tuples (O.id, O.str, O.loc, O.sscore). For this example database, the objects are depicted in two-dimensional space, such that O.loc=(x, y) and describes x and y co-ordinates respectively (e.g., the location 506 of FIG. 5). These coordinates may be derived from longitude and latitude information. Type-ahead search (TAS) may be performed over O.str. One skilled in the art of data processing may appreciate that this example is discussed herein for its simplicity, as the techniques discussed herein are not limited to databases defined in accordance with this example data model. Further, the example techniques discussed herein may be conveniently utilized, at least, for multi-dimensional databases having dimensionality greater than 2, and for any $L_p$ metric, or other metrics.

For example, the database may include a Yellow Page database that includes names and locations of businesses, as shown in FIG. 5. Thus, O.str denotes a name of the object, O.loc denotes its geographical location and O.sscore indicates the overall score computed using a number of factors such as the popularity, number of reviews, and ratings of the business.

As shown in FIG. 5, multiple database objects may be associated with the same string (e.g., database objects $O_7$ and $O_9$ are both associated with a string value 504 "Starbucks"). While many searches may be entered using the name of a business, users may also prefer a search by the type of business they are looking for. For example, users may search for "coffee" instead of "Starbucks" when they are looking for coffee shops. Such searches may be supported, for example, by associating the descriptions with the database objects.

For the example of FIG. 5, a user may wish to search the spatial database 500 to determine a desirable business entity based on the string value 504 and a location currently associated with the user (e.g., the location 106). For example, the user may wish to find a Starbucks that is desirable in terms of proximity to the user's current location and popularity or ratings. If the user is currently at spatial location (36,0) and has progressively typed in a prefix string "star" on a mobile computing device such as a smart phone device, it may be determined that the database objects $O_7$ (522) and $O_{10}$ (528) are valid completions of the current user query. The Starbucks represented by database object $O_{10}$ (528) may be determined to be closest in proximity to the current location associated with the user, and the user may receive the information associated with the database object $O_{10}$ (528) ranked first in a list of retrieved recommendation items as the user continues to type. Information associated with the Starbucks represented by database object $O_7$ (522) may also be received and presented as ranked second in the list of retrieved recommendation items. The user may thus receive a satisfactory result to the query, and may decide at this point that no more character entry is desirable, as the user may choose to travel to either of the Starbucks stores that have been retrieved, based on a personal preference of the user.

From a search strategy perspective, it may be desirable to determine spatial proximity at a fine granularity, especially for mobile searching. For example, a search technique that is proximity-oblivious for all database objects located in a city may provide somewhat undesirable results. For such a search technique, if all the objects in FIG. 5 are located in the same city, the proximity-oblivious search technique could return the farther Starbucks (database object $O_7$ (522), which may be located at the other end of the city, from the user's perspective) as its highest ranked answer instead of the nearby one (database object $O_{10}$ (528), which may be located in the same block as the user).

Furthermore, other criteria such as the popularity and ratings of the objects may also be considered in a result ranking function. For the example of FIG. 5, other criteria may be modeled as the static score 508 associated with each database object. For example, if the user provides a query "shan" as a prefix string from location (37, 3), a search technique that considers only proximity as a ranking criterion may return the database object "Shanghai Garden" represented by database object $O_4$ (516) as a top result of the query. However, the database object "Shanghai Cafe" represented by database object $O_6$ (520) may be a more desirable result if it is a much more popular restaurant, and is only slightly farther from the user's current location compared to the database object $O_4$ (516). Therefore, a ranking function that combines, or aggregates, both proximity and static score may be desirable.

Figure 6:
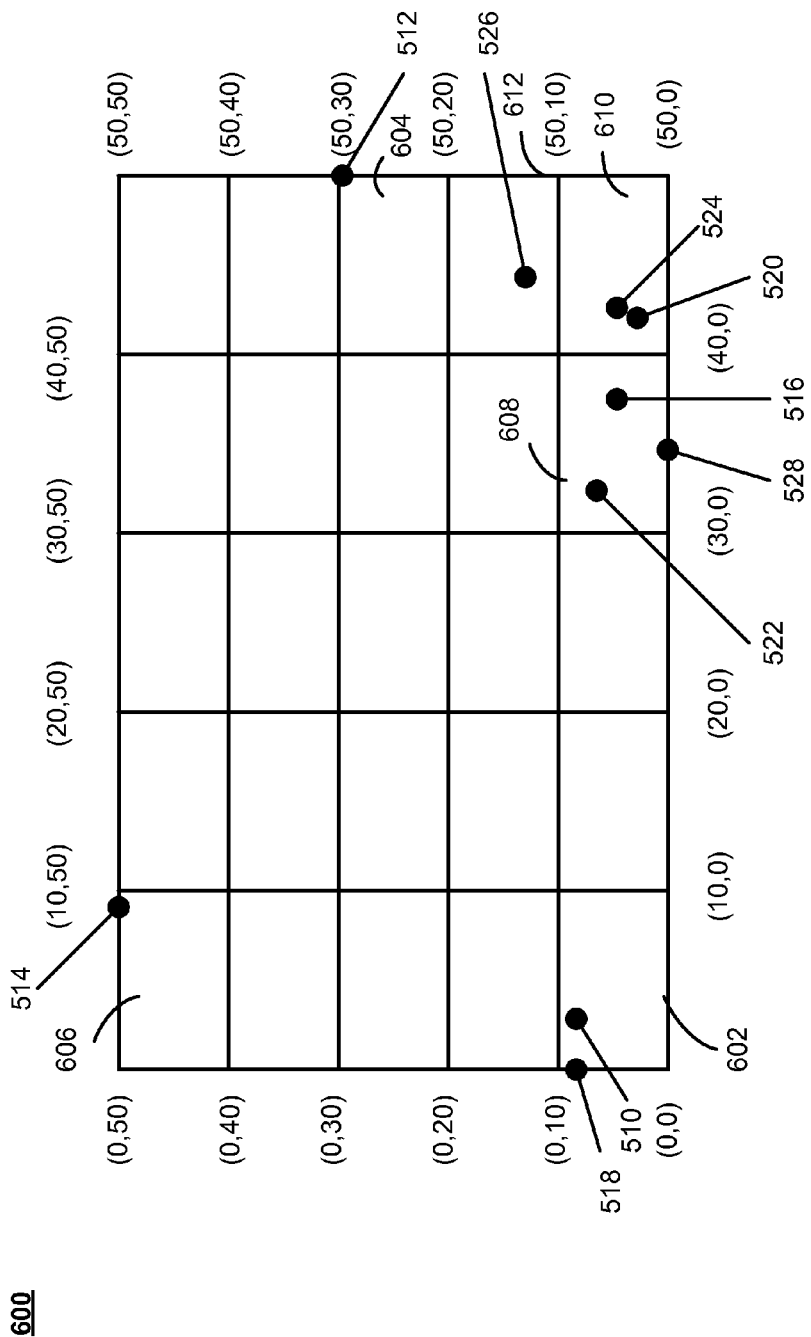
FIG. 6 is a diagram of an example grid illustrating example spatial relationships among the database objects of FIG. 5.

FIG. 6 is a diagram of an example grid 600 illustrating example spatial relationships among the example database objects of FIG. 5. As shown in FIG. 6, 25 spatial regions, or cells, of the grid 600 each have dimensionality 10×10, based on 2-dimensional coordinate units. As shown in FIG. 6, the example database objects 510 and 518 are located in a rectangular-shaped grid cell 602 that is bounded on the lower left (ll) by the 2-dimensional point (0,0) and on the upper right (ur) by the 2-dimensional point (10,10). The example database object 512 is located in a rectangular-shaped grid cell 604 that is bounded on the lower left by the 2-dimensional point (40,20) and on the upper right by the 2-dimensional point (50,30).

The example database object 514 is located in a rectangular-shaped grid cell 606 that is bounded on the lower left by the 2-dimensional point (0,40) and on the upper right by the 2-dimensional point (10,50). Further, the example database objects 516, 522, and 528 are located in a rectangular-shaped grid cell 608 that is bounded on the lower left by the 2-dimensional point (30,0) and on the upper right by the 2-dimensional point (40,10). The example database objects 520 and 524 are located in a rectangular-shaped grid cell 610 that is bounded on the lower left by the 2-dimensional point (40,0) and on the upper right by the 2-dimensional point (50,10).

The example database object 526 is located in a rectangular-shaped grid cell 612 that is bounded on the lower left by the 2-dimensional point (40,10) and on the upper right by the 2-dimensional point (50,20). As discussed further herein, this type of spatial context associated with database objects may be represented by structures that may augment string-oriented structures to provide efficient progressive spatial search over strings.

Figure 7:
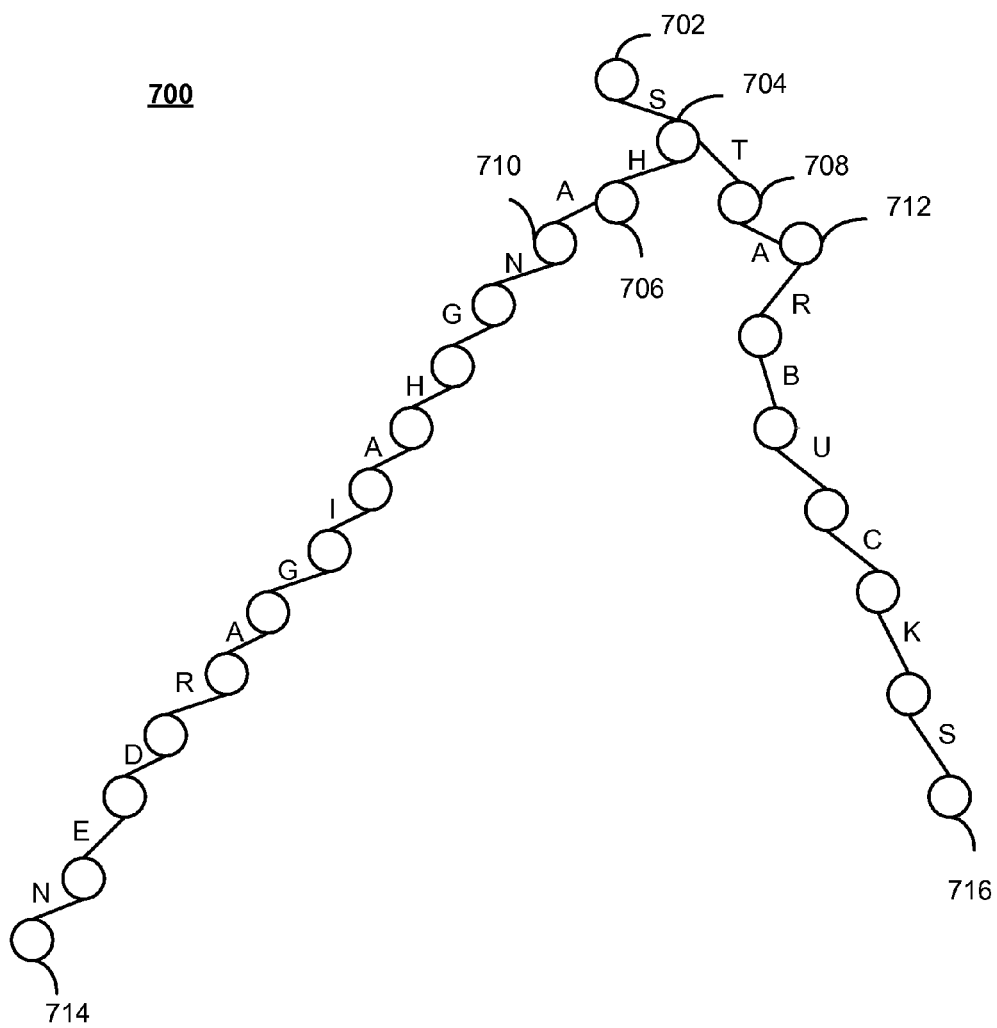
FIG. 7 is a diagram of an example search structure for character strings.

FIG. 7 is a diagram of an example search structure for character strings. As shown in FIG. 7, an example trie structure 700 may include information for progressively searching for valid strings "Shanghai Garden" and "Starbucks". The trie structure 700 includes an initial node, or root node 702, for use as an initial point in the search of the structure 700. The initial node 702 includes information for locating a subtree represented by a node 704, for potential traversal of the subtree. As shown in FIG. 7, the node 704 represents the character "S". Thus, if a search is performed that includes a query with "S" as a first character, the node 704 may be visited, and its subtrees may be traversed, based on progressive characters in the query. For example, the node 704 indicates two subtrees represented by child nodes 706 and 708 of node 704. The child node 706 represents the character "H" (via prefix string "SH") and the child node 708 represents the character "T" (via prefix string "ST"). Thus, if a query includes a prefix string "SH", then the search may progressively proceed down the subtree represented by the node 706, while if the query includes a prefix string "ST", then the search may progressively proceed down the subtree represented by the node 708.

Similarly, if the query includes a prefix string "SHA", then the search may progressively proceed down the subtree represented by the node 710, while if the query includes a prefix string "STA", then the search may progressively proceed down the subtree represented by the node 712. If the query includes a prefix string "SHAW" then a result indicating an unsuccessful search may be returned, as strings beginning with the prefix string "SHAW" may be invalid strings for the trie structure 700 as shown. However, if the query progressively includes all the successive characters included in the string "Shanghai Garden" then a successful result may be returned, indicating a valid string for the trie structure 700, as the search progressively proceeds down the subtree associated with node 710 until reaching a terminal node 714 representing the string "Shanghai Garden". Similarly, if the query progressively includes all the successive characters included in the string "Starbucks" then a successful result may be returned, indicating a valid string for the trie structure 700, as the search progressively proceeds down the subtree associated with node 712 until reaching a terminal node 716 representing the string "Starbucks".

One skilled in the art of data processing will understand that, from the perspective of a particular node in a tree structure such as the trie 700, nodes preceding the particular node in a structural path emanating from the initial node 702 are indicated as ancestors of the particular node, while nodes included in a path from the particular node to a terminal node may be indicated as descendant nodes of the particular node. Nodes connected directly to the particular node via a single edge in a structural path may be indicated as a parent of the particular node (if an ancestor) or as a child of the particular node (if a descendant).

Architectures such as the example architecture of FIGS. 1a-1c that integrate a trie structure with a spatial data structure, for example, to enable location-aware type-ahead searching (TAS), or progressive searching on spatial databases, are discussed herein. According to an example embodiment, a single trie (e.g., the trie structure 140 of FIGS. 1a-1c) may be maintained for an entire spatial database, and the trie may be augmented with spatial information associated with the database objects so that location-aware search may be performed inside the trie structure. Such a trie for a subset of the example database of FIG. 5 is discussed below.

Figure 8:
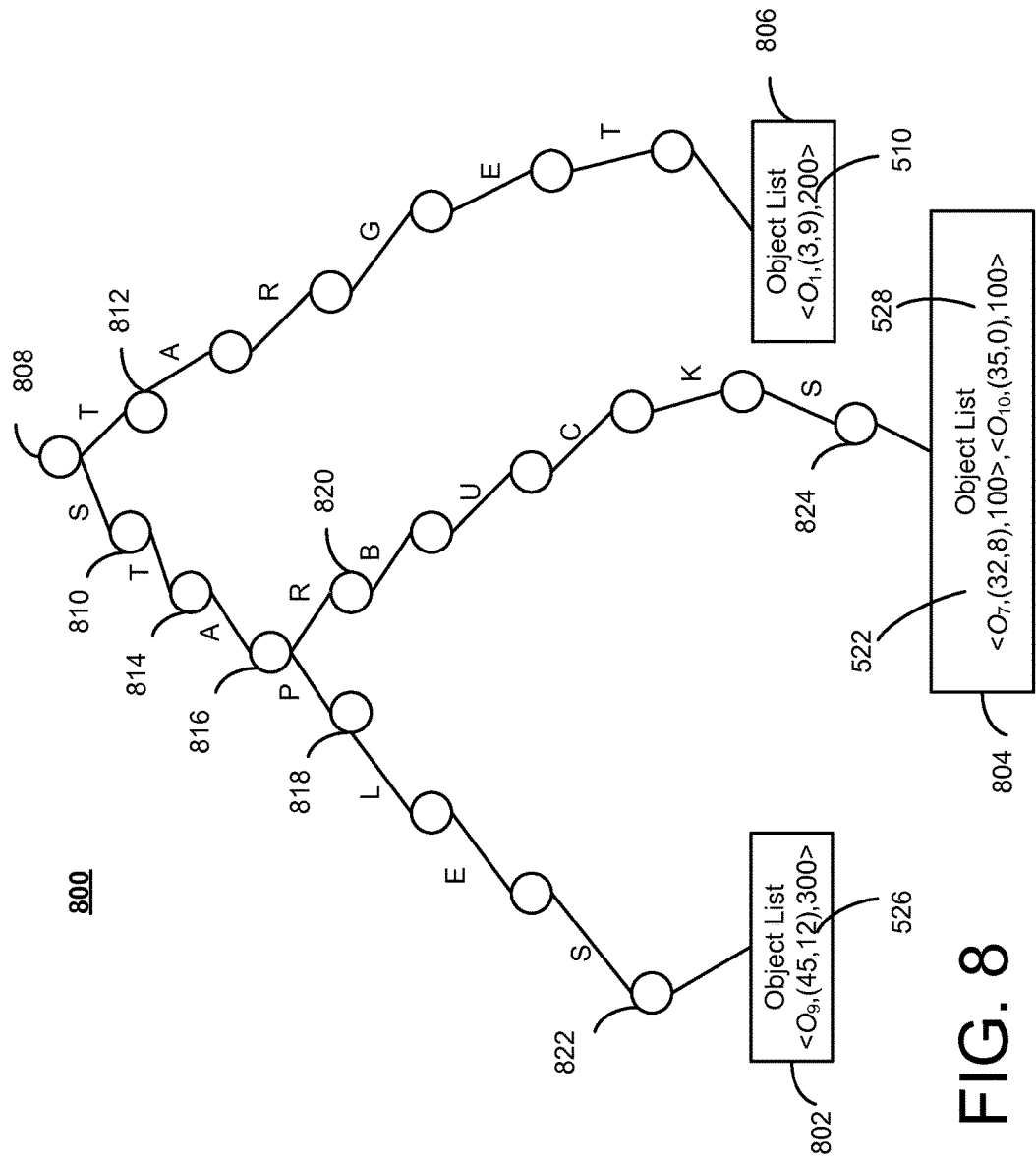
FIG. 8 is a diagram of an example search structure for character strings that stores associated objects in terminal nodes.

FIG. 8 is a diagram of an example search structure for character strings 800 that stores associated objects in terminal nodes. As shown in FIG. 8, the example search structure 800 is based on a subset of the example database 500 of FIG. 5 discussed above. The subset includes the database objects $O_1$ (510), $O_7$ (522), $O_9$ (526), and $O_{10}$ (528) that are stored in structures depicted in FIG. 8 as object lists 802, 804, and 806 that are associated with terminal nodes of the search structure 800. Similar to searching the trie structure 700 discussed above, a search of the structure 800 begins at an initial node 808 and proceeds to its two child nodes 810 and 812. As shown in FIG. 8, the node 810 is an internal, or non-terminal node representing the character "S" and the node 812 is an internal, or non-terminal node representing the character "T". Thus, if a query begins with the character "S", the search may follow a traversal of the subtree represented by the node 810, while a search associated with a query beginning with the character "T" may follow a traversal of the subtree represented by the node 812. Search strings beginning with characters other than "T" or "S" may be determined to be invalid strings in the context of FIG. 8, as they may not match any of the strings represented by the database objects $O_1$ (510), $O_7$ (522), $O_9$ (526), and $O_{10}$ (528) of FIG. 8.

An example technique for supporting type-ahead search in the architecture of FIG. 8 may include identifying a trie node that matches a prefix query string, then traversing the entire subtree below the identified node, computing ranking scores of the objects in the subtree, and returning the top k ranked objects in that subtree.

For example, if a prefix query string received from a user so far includes "STA", then a search may begin at the initial node 808, traversing through node 810 (representing "S"), node 814 (representing "T"), until reaching node 816 (representing "A"). At this point, the node 816 may be identified as matching the prefix query string "STA". The entire subtree below node 816 may then be traversed, computing ranking scores of the objects in the subtree, and returning the top k ranked objects in the subtree. Thus, the subtrees emanating from nodes 818 and 820 (child nodes of node 816) may be traversed down to the terminal nodes 822 and 824, respectively. The database objects stored in association with the object lists 802 and 804, respectively, may be included in the computation of the ranking scores, and the objects having the top k ranking scores may be returned as results of the query based on the prefix query string.

Responsiveness may be a desirable feature of a progressive search, as a user may prefer that a display of results appear "instantaneously" (from a user perspective), as the user continues to progressively provide characters of the desired string. For example, users may prefer techniques that provide results within a maximum response time of 100 milliseconds. In a client-server setting, this 100 ms bound may include the structural search time and other overheads such as network overhead. Hence, it may be desirable to minimize structural search time. The example search technique discussed above with regard to FIG. 8 may not satisfy minimal search time preferences of some users, as it may traverse more links in the trie 800 and generate scores of more objects than potentially more efficient techniques, as discussed further herein.

As another example, the top k answers for each query and for each query location may be materialized. However, this example may involve substantial space overhead. Another variant that maintains materialization at the granularity of regions may involve substantial space overhead.

In this context, a "materialized node" of a search structure (e.g., a trie or tree structure) includes data additional to node information needed for traversing the structure that is stored in association with the node storage representation. For example, additional data may include a list of items satisfying a query, or other data or structures (e.g., bounds data) that may be used to determine whether further traversal of a structure may be desirable, whereas an identifier and a pointer to a next node or previous node may be stored as node information for use in traversing the structure. Thus, for example, materialized nodes may be leaf nodes or intermediate nodes in the structure. For example, during traversal of a structure, it may be possible to obtain result information by visiting an intermediate node that is materialized, instead of following paths to all descendant leaf nodes of the intermediate node to obtain results by visiting the leaf nodes. As another example, an intermediate node may be materialized with information that may aid in determinations that a search may be resolved without following paths to descendant nodes of the intermediate node, thus providing more efficient searching techniques in terms of numbers of nodes traversed (and visited) during a search.

According to an example embodiment, as discussed herein, score bounds may be materialized at trie nodes. For the example of FIG. 8, the score bounds may include upper bounds of the scores of any database object included in subtrees of that materialized node. At query time, the score bounds may be included in determinations to prune subtrees, i.e., to avoid traversal in portions of the structure that will not contribute any objects to the top k results.

Due to limited availability of main memory, a system administrator may choose to materialize bounds in only a subset of trie nodes. As discussed below, not all such subsets may be equally beneficial in saving query processing cost. For example, materializing a parent and child node in a trie with similar score bounds may prove to be less beneficial compared with choosing two nodes with significantly different upper bounds. Hence, the administrator may desire a judicious selection of the subset of nodes. Further, the benefit of storing score bounds at a fine spatial granularity may be much higher in some nodes than in others. For example, the administrator may not prefer fine granularity score-bounds for a node with high spatial locality. Therefore, the administrator may prefer an adaptive approach in selection of granularity, i.e., by storing coarse-granularity bounds over regions that have high locality, and fine-granularity bounds elsewhere.

As discussed herein, example techniques may be utilized that select a subset $\mathcal{M}$ of trie nodes (e.g., a $\mathcal{M}$ node selection technique) and store $\mathcal{R}$ bounds in each of them (e.g., an $\mathcal{R}$ cover computation technique), such that expected query processing cost may be minimized. Such example techniques may result from analysis of an $\{\mathcal{M}, \mathcal{R}\}$ Distribution Problem.

According to an example embodiment, as the user types in the query, with every key stroke, the string entered so far may be sent to the TAS system along with an indication of a location associated with the user. For example, as the user 108 progressively provides character input, the prefix portion 118 may be sent with the location information 106 discussed above (with every key stroke of the user 108). In response, the TAS system may return the set of most relevant k spatial objects from the database (e.g., the suggested items 128). More formally, the query Q therefore may include two components:
 (i) the string typed so far, indicated herein as Q.str, and
 (ii) the location Q.loc associated with the user during the entry of the query.

Furthermore, without loss of generality, the database $\mathcal{D}$ may be viewed as being included in a global rectangular region Global={ll, ur}, such that the location descriptions 506 of all database objects are included in Global, wherein Global.ll and Global.ur respectively denote the lower left and upper right corners of the rectangular region Global. Further, Q.loc may be located internally to Global.

Given a query Q and a spatial database $\mathcal{D}$, an example TAS system may return objects from $\mathcal{D}$ that are valid completions of Q.str. The set of such objects may be denoted as MatchSet(Q, $\mathcal{D}$). More formally, $$\text{MatchSet}(Q) = \{O | O \in \mathcal{D} \; \hat{} \; Q.str \text{ is a prefix of } O.str\}.$$

Further, Dist(Q.loc, O.loc) may denote the distance between the location of the query Q and database object O.

According to an example embodiment, the Euclidean distance metric may be utilized; however, any function that is monotone with respect to the distance along each dimension (i.e., x, y) may also be used. For example, all $L_p$ distance functions may satisfy this property.

According to an example embodiment, an overall score of an object O∈MatchSet(Q) for a query Q may be denoted as F(Dist(Q.loc,O.loc),O.sscore), wherein F is a function monotone with respect to the two components.

According to an example embodiment, a final score may be generated as a linear interpolation of the individual normalized scores of the two components as shown in Equation 1:

$$F(Q, O) = w_d \times \left(1 - \frac{Dist(Q.loc, O.loc)}{\max Dist}\right) + w_s \frac{O.sscore}{\max SScore}, \quad (1)$$

wherein
 $w_d$, $w_s$ are two parameters, s.t. $w_d + w_s = 1$,
 maxDist is the maximum distance between any object and query,
 maxSScore is the maximum static score of any object in the database, and
 maxDist=Dist(G.ll, G.ur)

According to an example embodiment, a system designer may select values of weights $w_d$ and $w_s$ to control the relative importance of the two components in the overall score. The values maxDist and maxSScore may be used to normalize the distance score and static score, respectively.

An example query problem may be denoted more formally as:
 Given a query Q=(str, loc), a spatial database $\mathcal{D}$, and the number k of desired objects, identify the result set Res(Q, k) such that |Res(Q, k)|=k Among these objects, it may be desirable to return the k objects that are in close proximity to the query location and that have high static score. An example ranking function may thus be described as satisfying:

∀O∈Res(Q,k), O∈MatchSet(Q), the objects in Res(Q, k) have the highest scores among all objects in MatchSet(Q), i.e., for any object O∈Res(Q, k) and
any object O'∈MatchSet(Q)−Res(Q, k), F(Q, O)≥F(Q, O').

According to an example embodiment, type-ahead search (TAS) may be provided via an ordered tree data structure such as a trie or a Patricia tree.

Thus, for example, type ahead search may be supported by inserting all search strings into a trie τ. Formally, $n_τ$ may denote a node in τ and Subtree ($n_τ$) may denote the entire subtree under the node.

According to an example embodiment, searching may be performed by first identifying the node that matches the current query string (e.g., a prefix string), which may be denoted as a query matched node (QMN(Q)), followed by performing a search in Subtree(QMN(Q)). A trie node $n_τ$ may be uniquely identified by a string, wherein the string corresponds to the labeled path from a root of τ to $n_τ$. Further, Q matches $n_τ$ if the string associated with $n_τ$=Q.str. As an example, the third child (node 710) in the left subtree of the root node in FIG. 7 matches with query string "STA", and thus, node 710=QMN("STA").

According to an example embodiment, a single trie may be maintained over all object strings in the database $\mathcal{D}$. For example, the single trie structure 140 of FIG. 1 may be maintained over all object strings associated with the database objects 510-528 of FIG. 5. Each trie leaf $l_τ$ (e.g., terminal node 142) may include an object list (e.g., retrieval items 146a, 146b, 146c) that shares the same string. As discussed above, each object in the object list includes attributes (O.id, O.loc, O.sscore)

As discussed above, FIG. 8 depicts such a structure over a subset of objects ($O_1$, $O_7$, $O_9$, $O_{10}$) of the database of FIG. 5. Given a query Q and trie τ, a search may begin in τ by identifying QMN(Q). Res(Q, k) may be determined by visiting each terminal node 142, or leaf $l_τ$ in QMN(Q)) and resolving complete scores of all objects encountered there, and selecting k objects that are associated with the overall k-highest scores. A global priority queue GPQ may maintain the k-objects with highest scores encountered thus far. GPQ may be updated once the scores of all objects included in a terminal node are computed (denoted as LeafNodeSearch in Algorithm 1 below). An example Algorithm 1 as shown below more formally illustrates these example steps that may be performed for obtaining a list of recommended objects in response to a string query.

---

Algorithm 1

Algorithm 1: Baseline algorithm for location-aware type ahead search

Data: Trie τ, Query Q, integer k, Priority Queue GPQ
Result: Top k ranked object results of query, Res(Q, k)

-continued

Algorithm 1
Algorithm 1: Baseline algorithm for location-aware type ahead search

```
Perform lookup in Trie τ to determine QMN(Q)
for each leaf l_τ ∈ QMN_tree (Q) do
    Update GPQ = LeafNodeSearch(l_τ);
end for
return Res(Q,k);
```

The example structure discussed above may support any ranking function, and may provide information for the search in optimal space.

According to an example embodiment, an improvement over a linear scan associated with Algorithm 1 may potentially reduce LeafNodeSearch cost by avoiding the complete scan of the object list in each terminal node, or leaf node. For example, a Threshold Algorithm (TA) may be used within the LeafNodeSearch function of Algorithm 1, via sorted accesses on individual ranking components (e.g., with a getNext( ) interface on static score and distance). A TA based technique may terminate earlier if random access is provided for a static score table. For example, quad trees or kd trees may be used for storing the objects in the terminal nodes. The k-th largest score in GPQ may be used to determine a termination condition of TA processing.

Algorithm 1 may thus return the list of suggested items 128 of FIG. 1, with visits to each terminal node 142 included in subtrees of QMN(Q), with score determinations performed for each terminal node 142 included in the subtrees.

As discussed below, a search structure may also be generated that may involve fewer visits to terminal nodes 142 included in subtrees of QMN(Q), thus providing a potentially faster search response to the query Q. As discussed above, a goal of searching discussed herein may be to provide the "best" database objects, or retrieval items 146 (denoted herein as Res(Q, k)), in accordance with a ranking function F. In determining such a search structure, it may be desirable, as a preliminary consideration, to include one or more features that may further reduce processing cost in searches of the structure.

As discussed above with regard to Algorithm 1, node QMN(Q) for query Q may be determined as a preliminary step in determining the result list of objects Res(Q, k) (e.g., suggested items 128 of FIG. 1). The terminal nodes of subtrees of node QMN(Q) may then be visited in order to determine scores (e.g., ranking values) of the database objects included in the terminal nodes (e.g., retrieval items 146 of FIG. 1).

If $\mathcal{L}_{\{Q,k\}}$ denotes the total number of links traversed, and $Sc_{\{Q,k\}}$ denotes the total number of objects for which scores are determined during query processing, a cost equation may be determined as shown in Equation 2:

$$QPCost(Q,k) = Cost(QMN(Q)) + c_1 \times \mathcal{L}_{\{Q,k\}} + c_{sc} \times Sc_{\{Q,k\}}, \quad (2)$$

wherein
$c_1$ is a constant that denotes unit link traversal costs, and
$c_{sc}$ is a constant that denotes score computation costs Since Cost (QMN(Q)) may be significantly less than the other two costs, it may be desirable to determine techniques to improve link traversal cost and score computation cost (e.g. cost of determining ranking values), ignoring the lesser cost of determining (QMN(Q)). As discussed above, Algorithm 1 traverses the entire subtree (QMN(Q)) during determination of Res(Q, k).

If |Subtree (QMN(Q))| denotes the subtree size, and $Obj_{l_\tau}$ denotes the number of objects processed at terminal node, or leaf $l_\tau$ during LeafNodeSearch($l_\tau$), a cost equation based on the subtree size and number of objects may be determined as shown in Equation 3:

$$QPCost(Q,k) = (c_1 \times |\text{Subtree}(QMN(Q))|) + \Sigma_{\forall l_\tau \in Subtree(QMN(Q))}(c_{sc} \times obj_{l_\tau}) \quad (3)$$

Since a type-ahead search attempts to return the most useful results as the user provides the initial few characters of the search string, it may desirable to provide the top-k valid completions as quickly as possible. However, the size of the Subtree(QMN(Q)) may be quite large in the beginning, as the prefix string only includes two or three characters. Further, many of the subtree link traversals and score computation may ultimately be wasted, as only a small fraction of the terminal nodes of Subtree(QMN(Q)) may eventually contribute to the result list Res(Q, k). Thus, it may be desirable to provide efficient query processing techniques based on intelligently selecting paths of Subtree (QMN(Q)) for traversal that eventually contribute to the final Res(Q, k).

According to an example embodiment, a search structure may be generated based on materializing trie nodes with score-bounds that denote the maximum-scores any objects under that particular trie node subtree may receive, when a query Q matches that particular trie node. One difficulty encountered in determining such bounds is the consideration of valid query locations, which are unknown during preprocessing of a search structure, but which impact scores of the various database objects involved in searches. However, for valid pre-computed score-bounds of nodes, a query processing algorithm may benefit by comparing the pre-computed score-bound with a k-th largest object score computed thus far during query processing. If the pre-computed score-bound is not larger than the current k-th largest object score, then the entire subtree under that particular trie node may be pruned (i.e., a traversal of the subtree is avoided).

As an example, the database 500 of FIG. 5 includes a subset of objects $O_1$, $O_7$, $O_9$, and $O_{10}$ (522, 526, 528, respectively) that are included in the corresponding partial trie 800 illustrated in FIG. 8. As shown in FIG. 8, the object lists 802, 804 under the trie node "STA" (816) include $O_7$, $O_9$, and $O_{10}$. The score-bound of trie node 816 may be determined as 0.8 (e.g., as an aggregation of distance score 0.5 and static score 0.3 for object $O_9$, assuming equal weights). According to an example embodiment, the distance score in score-bound may be generated optimistically during pre-computation, since the distance between the actual Q.loc and the object during a query may be infinitesimally small (e.g., as small as 0 theoretically) in reality.

However, the actual score of a database object under a node may be significantly smaller than the pre-computed score-bound of that node. In the previous example, an actual score of $O_9$ may not reach 0.8 unless Q.loc=$O_9$.loc. For any other Q.loc, the distance component score may be smaller than 0.5. Therefore, storing only one score-bound per trie node that satisfies every valid Q.loc may not provide the most desirable search technique, in terms of efficiency, for large databases. However, for some smaller databases, the single bound approach may suffice.

According to an example embodiment, an intermediate approach may partition Global into a set of regions of smaller granularity and store respective score-bounds associated with each region. Each of the smaller partitions may thus be denoted as a region. The regions collectively satisfy a cover property over Global, i.e., each point location in Global is included in one of the cells, so that score-bound may be determined for any Q.loc. According to an example embodiment, the regions may be of equal size, although variable size regions may also be used.

Such a cover at node n with bounds may be denoted as a spatial grid of bounds at the node $n_\tau$ (formally denoted as SGB($n_\tau$)). Each region of a spatial grid (G) may be denoted as a cell. According to an example embodiment, the granularity of a spatial grid may be determined by a domain expert, and a search structure generator (e.g., structure generator 304) may assign score-bounds to the regions (cells) of SGB($n_\tau$).

Figure 9:
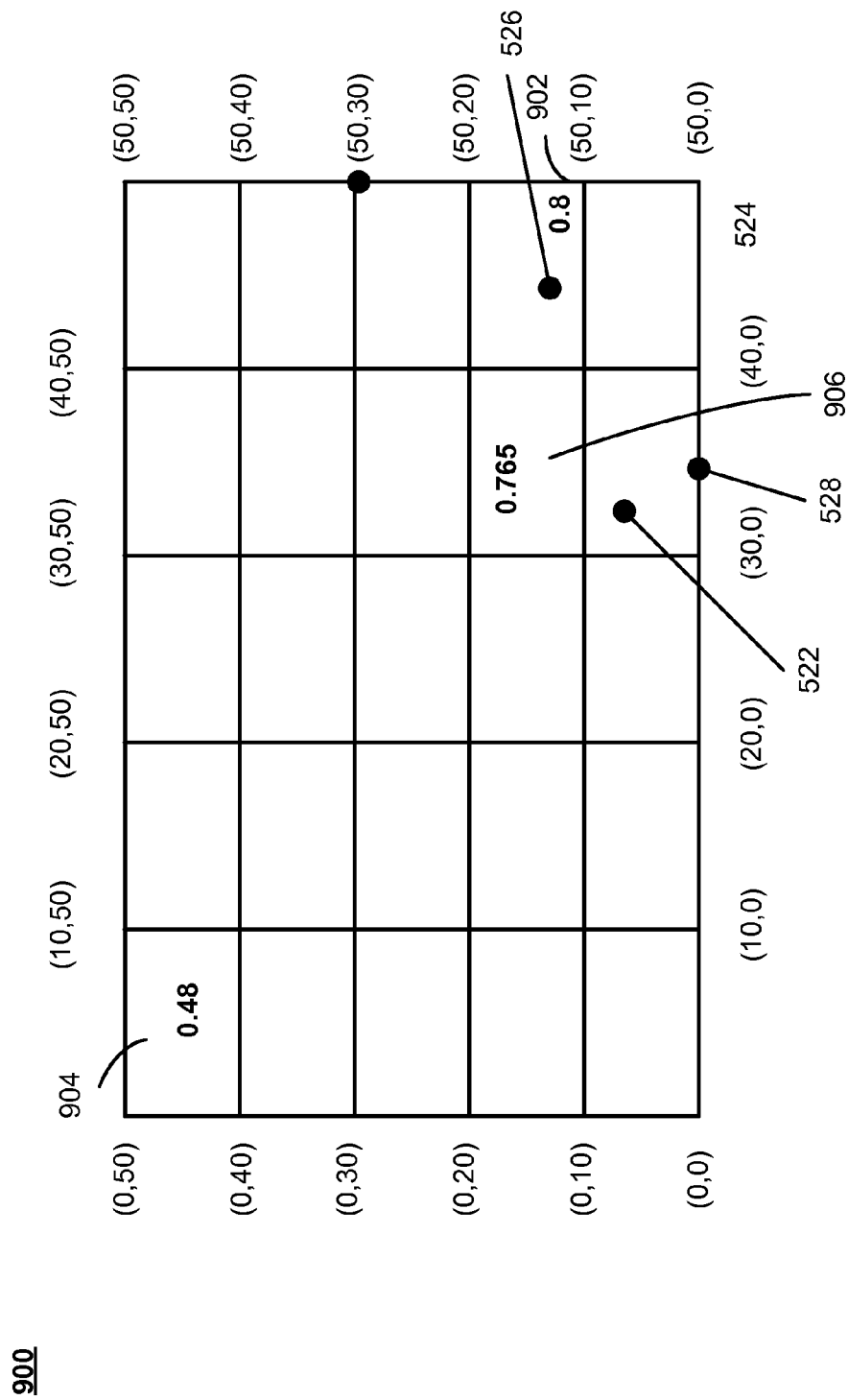
FIG. 9 is a diagram of an example spatial grid of bounds (SGB) illustrating example spatial relationships among database objects associated with a trie node.

FIG. 9 is a diagram of an example spatial grid of bounds (SGB) 900 illustrating example spatial relationships among database objects associated with a trie node. As shown in FIG. 9, 25 spatial regions, or cells, of the SGB 900 each have dimensionality (e.g., granularity) 10×10, based on 2-dimensional coordinate units. The database objects shown in FIG. 9 correspond to the database objects included in the object lists 802 and 804 that are associated with the node 816 representing the string "STA" of FIG. 8. As shown in FIG. 9, the example database objects 522 ($O_7$) and 528 ($O_{10}$) are located in a rectangular-shaped grid cell that is bounded on the lower left by the 2-dimensional point (30,0) and on the upper right by the 2-dimensional point (40,10). The example database object 526 ($O_9$) is located in a rectangular-shaped grid cell that is bounded on the lower left by the 2-dimensional point (40,10) and on the upper right by the 2-dimensional point (50,20).

As shown in FIG. 9, only the grid cell {(40, 10), (50, 20)} (902) includes a score-bound 0.8, whereas the grid cell {(0, 40), (10, 50)} (904) includes a much smaller score-bound of 0.48. A query that is included in the cell 904 is thus associated with a tighter score-bound (as compared to a single score-bound) by the SGB 900. As shown in FIG. 9, a cell 906 includes a score-bound 0.765.

According to an example embodiment, a score-bound of a grid cell g may be determined in accordance with Equation 3 as shown below.

$$\text{Score-bound}(g, n_\tau) = \text{argmax}_{\forall O_j \in Subtree(n_\tau)} \text{Max-Score}(O_j), \quad (3)$$

s.t. g.ll.x ≤ Q.loc.x ≤ g.ur.x and g.ll.y ≤ Q.loc.y ≤ g.ur.y

If $\mathcal{N}_\tau$ represents the set of intermediate (internal, or non-terminal) nodes in a trie τ, S represents the space available for materialization, and p(Q) denotes the probability or likelihood of Q being issued, a goal of memory distribution may be to Minimize $\Sigma_{\forall Q}(p(Q)) \times \text{QPCost}(Q)$, such that ($0 \leq s_{n_\tau} \leq S$), and $$\left( \sum_{(\forall n_\tau \in N_\tau)} s_{n_\tau} \leq S \right),$$

wherein $s_{n_\tau}$ denotes the allocated space for materialization at the intermediate (non-terminal) trie node $n_\tau \in \mathcal{N}_\tau$.

If the possible assignments for $s_{n_\tau}$'s are either 0 (no materialization) or $\mathcal{R}$ (a predefined number designed by a domain expert), wherein S=|$\mathcal{M}$|×$\mathcal{R}$, a less restrictive goal of memory distribution may be to Minimize $\Sigma_{\forall Q}(p(Q)) \times$ QPCost(Q), such that $s_{n_\tau} = 0$ or $\mathcal{R}$ and $$\left( \sum_{(\forall n_\tau \in N_\tau)} s_{n_\tau} \leq S \right), \text{ and } \sum_{s_{n_\tau} = R} n_\tau = |\mathcal{M}|,$$

wherein $s_{n_\tau}$ denotes the allocated space for materialization at the intermediate (non-terminal) trie node $n_\tau \in \mathcal{N}_\tau$. These goals may be denoted as an {$\mathcal{M}$, $\mathcal{R}$} Distribution Problem.

According to an example embodiment, an $\mathcal{R}$-cover may be determined independently at a trie node, while $\mathcal{M}$-node selection may depend on an $\mathcal{R}$-cover to determine the set $\mathcal{M}$. A trie with |$\mathcal{M}$| nodes, where each node has $\mathcal{R}$-cover may be denoted as a bound materialized trie TBM.

The discussion below illustrates an example $\mathcal{M}$ Node Selection problem, followed by an example $\mathcal{R}$ cover computation problem.

According to an example embodiment, an $\mathcal{M}$ Node Selection technique may include modeling the benefit of a set $\mathcal{M}$ of materialized trie nodes at QPCost. For example, the benefit of a single materialized node $n_\tau$ at a query Q may be analyzed. Since the actual QMN(Q) may be unknown during preprocessing, each node $n'_\tau$ ($n_\tau$'s ancestor) may be assumed as QMN(Q). According to an example embodiment, a query log (e.g., query log 326) may be used to obtain information associated with ancestor nodes. The actual k-th largest score may also be unknown during preprocessing, and SGB($n'_\tau$) may be used as an approximation. If Q.loc is known and corresponds to cell g' in SGB($n'_\tau$), and g in SGB($n_\tau$) respectively, then $$\frac{\text{score-bound}(g', n'_\tau)}{\text{score-bound}(g, n_\tau)}$$

may approximate the relative value of an actual k-th largest score at $n'_\tau$ and the score-bound at ($n_\tau$) (e.g., a larger ratio increases the likelihood of pruning at $n_\tau$).

Since Q.loc may be unknown at preprocessing, a query log may provide location distribution information of past $n'_\tau$ queries (if a query log is available). Thus, an Expected-Score-bound($n'_\tau$) may approximate a k-th largest score of $n'_\tau$, and an Expected-Score-bound($n_\tau$) may be used for determining ($n_\tau$)'s score-bound. According to an example embodiment, an average score bound may be used, if a query log is not available.

According to an example embodiment, a determination may be made of how much QPCost node $n_\tau$ saves upon materialization, considering remaining materialized nodes in set $\mathcal{M}$ that are $n_\tau$'s descendants, as query processing cost at n may be determined by aggregating link traversal cost (|Subtree($n_\tau$)|), and score computation cost (e.g., based on number of objects included in Subtree($n_\tau$)).

According to an example embodiment, a materialized frontier of $n_\tau$ may be determined. In this context, a materialized frontier includes the nearest materialized descendant nodes (i.e., one from each branch in Subtree($n_\tau$)) of $n_\tau$. Each such node may be denoted as MFr($n_\tau$).

Figure 10:
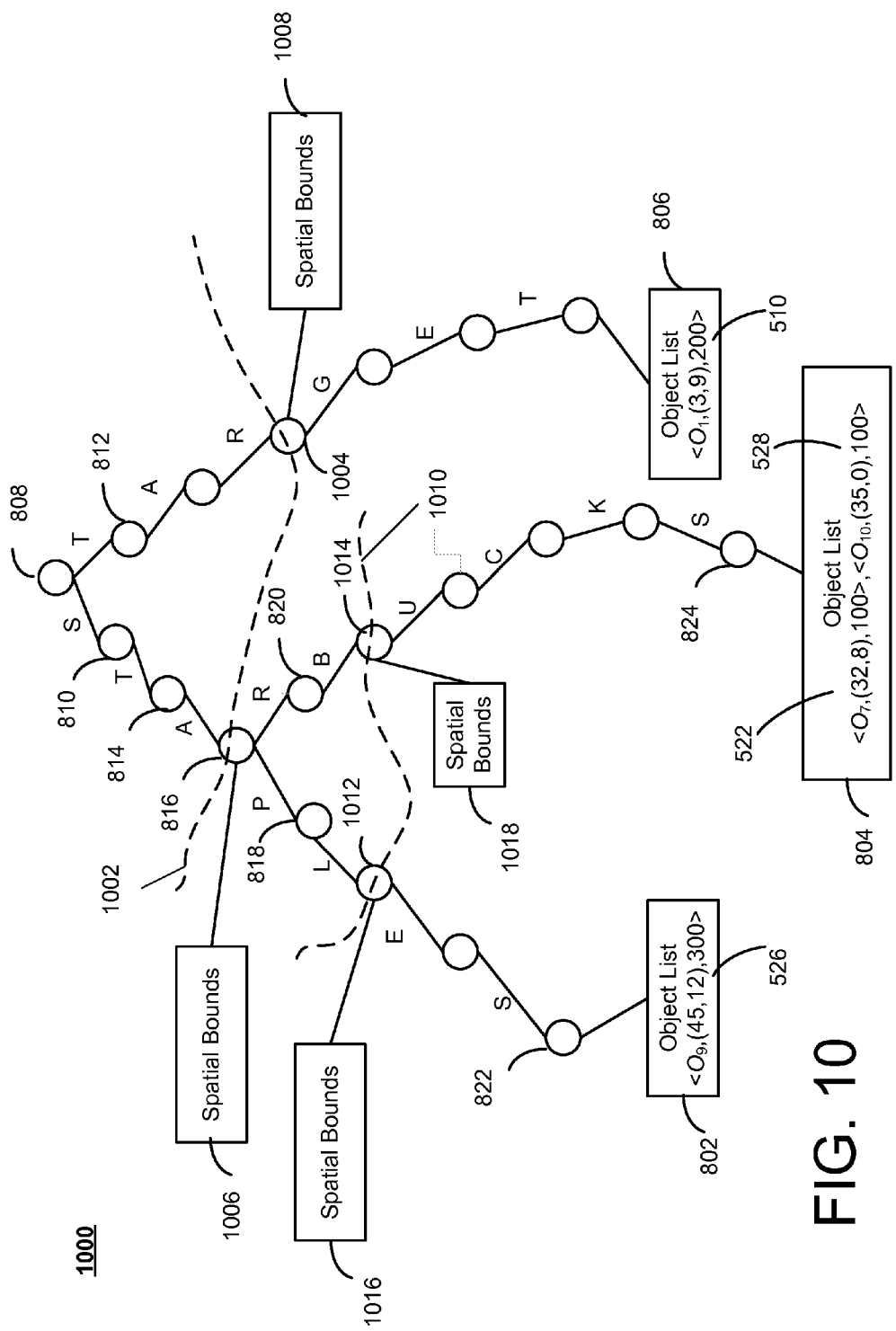
FIG. 10 is a diagram of an example augmented search structure for character strings that stores spatial bound indicators in selected non-terminal nodes.

FIG. 10 is a diagram of an example augmented search structure for character strings that stores spatial bound indicators in selected non-terminal nodes. As shown in FIG. 10, an example materialized frontier 1002 of trie root node 808 includes non-terminal nodes 816 and 1004. The nodes 816 and 1004 are materialized by including spatial bounds 1006 and 1008, respectively, in storage associated with the non-terminal nodes 816 and 1004 (e.g., as spatial bound indicators 134 stored in augmented node data 144 of FIG. 1a). An example materialized frontier 1010 of non-terminal node 816 (representing query prefix string "STA") includes non-terminal nodes 1012 and 1014. The nodes 1012 and 1014 are materialized by including spatial bounds 1016 and 1018, respectively, in storage associated with the non-terminal nodes 1012 and 1014.

According to an example embodiment, if a non-terminal node $n_\tau$ (e.g., node 816) is not materialized, a query processing technique may proceed further down the trie and traverse the entire Subtree($n_\tau$), except the subtree of $n_\tau$'s materialized frontier. Thus, a non-terminal node n may save higher QPCost upon materialization, if QPCost($n_\tau$) is much larger than the query processing cost of its materialized frontier. It may be understood notationally that QPCost($n_\tau$) may refer a to a function based on a query QMN at $n_\tau$, and k highest ranking results.

The cost savings of materialization of a node n may be denoted as shown in Equation 4:

$$\text{CostSave}(n_\tau) = \text{QPCost}(n_\tau) - \Sigma_{\forall MFr(n_\tau)} \text{QPCost}(MFr(n_\tau)) \quad (4)$$

For example, in FIG. 10, the QPCost associated with node 816 (representing query prefix string "STA") is 13, while the QPCost associated with the materialized frontier 1010 of node 816 is 9 (assuming $c_1=1$ and $c_{sc}=1$). A larger value may be inferred as implying a higher value of $n_\tau$'s materialization benefit.

According to an example embodiment, given $n'_\tau$, the likelihood of pruning at $n_\tau$ and CostSave($n_\tau$) are multiplied to denote $n_\tau$'s benefit to a query processing cost of $n'_\tau$. The result may be summed over each ancestor of $n_\tau$.

Thus, an example problem for node selection may be denoted as: Given a set of $\mathcal{N}_\tau$ trie nodes, select a set $\mathcal{M}$, such that Benefit($\mathcal{M}$) is maximized.

According to an example embodiment, a benefit function may be denoted in accordance with Equation 5:

$$\text{Benefit}(\mathcal{M}) = \sum_{(\forall n_\tau \in \mathcal{M})} \text{Benefit}(n_\tau, \mathcal{M}), \text{ and} \quad (5)$$

$$\text{Benefit}(n_\tau, \mathcal{M}) = \sum_{(\forall n'_\tau)} \frac{(\text{Expected-Score-bound}(n'_\tau))}{(\text{Expected-Score-bound}(n_\tau))} \times \text{CostSave}(n_\tau)$$

such that $n'_\tau$ is an ancestor of node $n_\tau$.

According to an example embodiment, a reasonably efficient alternative of this problem may include a randomized hill climbing algorithm to search for local optima, starting from a random $\mathcal{M}$ set and computing its associated benefit. At each step, the algorithm may visit a neighboring set of $\mathcal{M}$, swapping one random node from the existing $\mathcal{M}$ set that results in higher Benefit($\mathcal{M}$). One complete hill climbing process may terminate when all swapping possibilities of a set $\mathcal{M}$ have been explored. According to an example embodiment, a random-restart technique (with a predefined number, NoOfIteration) may be included in conjunction with the hill-climbing method that iteratively performs hill-climbing search, each time with a random initial set $\mathcal{M}$.

The hill climbing result $\mathcal{M}$ that corresponds to the highest Benefit($\mathcal{M}$) may be retained after all iterations. The random-restart technique may enhance the probability of obtaining the global optima. An example Algorithm 2 as shown below more formally illustrates these example steps that may be performed for obtaining a set $\mathcal{M}$ of non-terminal nodes that may provide a maximal benefit in materialization of nodes.

---
Algorithm 2
Algorithm 2: Example for randomized $\mathcal{M}$ node selection: algorithm to compute the best $\mathcal{M}$
---

Data: $\mathcal{N}_\tau$, set of intermediate trie nodes,
 NoOfIteration, number of random restarts,
 $|\mathcal{M}|$, the number of selected nodes
Result: $\mathcal{M}$
$\mathcal{M} = \{ \}$;
Prevset = $\{ \}$;
PrevBenefit = 0;
i = 1;
repeat
 $\mathcal{M} = \{$a randomly selected set of $|\mathcal{M}|$ trie nodes$\}$;
 while AllNeighborSet ($\mathcal{M}$) are not visited do
  $\mathcal{M}' =$ Remove one node from $\mathcal{M}$ uniform randomly, and replace that with a node chosen uniform randomly from $\mathcal{N}_\tau - \mathcal{M}$;
  $\mathcal{M} = \mathcal{M}'$ if Benefit ($\mathcal{M}'$) > Benefit ($\mathcal{M}$)
 end while
 if PrevBenefit < Benefit ($\mathcal{M}$) then
  Prevset = $\mathcal{M}$;
  PrevBenefit = Benefit ($\mathcal{M}$);
 end if
 i = i+1;
until $\{$i > NoOfIteration$\}$
$\mathcal{M}$ = Prevset;
return $\mathcal{M}$;

---

According to an example embodiment, generation of an example $\mathcal{R}$ cover at a trie node may include generating an SGB of grid $\mathcal{G}$, and generating an $\mathcal{R}$ cover on SGB if the number of cells in SGB is more than $\mathcal{R}$.

According to an example embodiment, a score-bound of a grid cell at a trie node may include the maximum Max-Score of each satisfying object under that node. Generation of Max-Score may consider optimistic distance scores for each object, and may be efficiently computed considering MINDIST, as denoted by Equations 6 and 7:

$$\text{Max-Score}(O, g) = w_d \times \left(1 - \frac{\text{MINDIST}(O.loc.g)}{\text{max}dist}\right) + w_s \frac{O.\text{sscore}}{\text{maxSScore}}, \quad (6)$$

$$\text{wherein MINDIST}(O, g) = |O.x - g_{r.x}|^2 + |O.y - g_{r.y}|^2, \quad (7)$$

$$\text{wherein } g_{r.x} = \begin{cases} g.ll.x, & \text{if } (O.loc.x < g.ll.x) \\ g.ur.x, & \text{if } (O.loc.x > g.ur.x) \text{ and} \\ O.loc.x, & \text{otherwise} \end{cases}$$

$$g_{r.x} = \begin{cases} g.ll.y, & \text{if } (O.loc.y < g.ll.y) \\ g.ur.y, & \text{if } (O.loc.y > g.ur.y) \\ O.loc.y, & \text{otherwise} \end{cases}$$

According to an example embodiment, the MINDIST(O, g) determination of Equation 7 may be defined over the Euclidean distance metric in hyperspace. However, one skilled in the art of data processing will appreciate that, at least, any $L_p$ distance metric (or other metric) may be utilized for determining distances between/among entities.

Given a cell g at $n_\tau$, Max-score may be computed for each object in $n_\tau$ to generate a Score-bound(g, $n_\tau$). Further, score-bound may be determined for every cell g in the grid $\mathcal{G}$. However, a naive computation may be quadratic in the number of objects, and the number of cells. Although done in preprocessing, repeating this quadratic computation at every trie node may involve undesirable computing resource costs.

However, since Score-bound(g, $n_\tau$) may be the highest (top-1) Max-Score of an object at $n_\tau$, an example Threshold algorithm (TA) style technique may be utilized, such that Score-bound(g, $n_\tau$) may be determined without generating Max-scores of all objects at $n_\tau$. According to an example embodiment, if the database objects are modeled as 2-dimensional objects (as shown in FIG. 5), three inverted lists may be used for representation of the objects at $n_\tau$ during TA. The three lists may be denoted as List.x (sorted in increasing x-coordinate distance), List.y (sorted in increasing y-coordinate distance), and List.sscore (sorted in decreasing static score). Each entry in an inverted list includes an object id, so that its complete score may be resolved using the object database $\mathcal{D}$.

According to an example embodiment, region specific TA may be performed by identifying interesting regions of g. The interesting regions of g may be determined as partitions of Global based on extreme points of the grid {g.ll; g.ur}.

Figure 11:
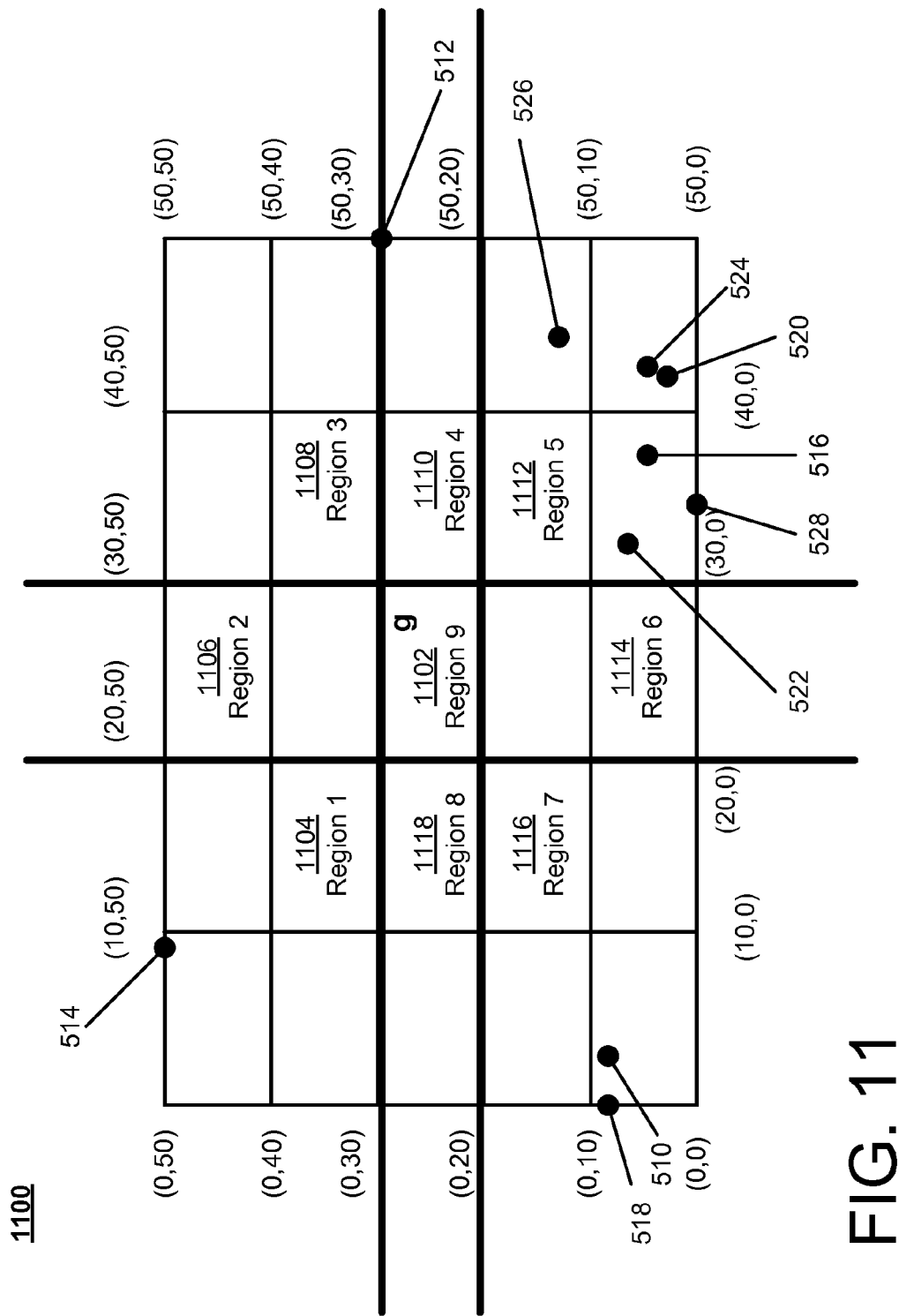
FIG. 11 is a diagram of an example grid illustrating example region relationships among the objects of FIG. 5.

FIG. 11 is a diagram of an example grid illustrating example region relationships among the objects of FIG. 5. As shown in FIG. 11, a cell g at a root node τ may be bounded on the lower left by the 2-dimensional point (20,20) and on the upper right by the 2-dimensional point (30,30), and may be included in a region 9 (1102) that is included in the cell associated with g. Interesting regions 1-8 (1104, 1106, 1108, 1110, 1112, 1114, 1116, 1118) of the cell g are shown as bordering on each side of the region 9 (1102), wherein the regional borders are shown as bold lines at x=20, x=30, y=20, and y=30.

According to an example embodiment, an example threshold algorithm (TA) may be used in generation of a score-bound of g for each region. Score-bound(g) may be determined as the maximum of the interesting region specific score-bounds. According to an example embodiment, the 3 inverted lists (e.g., inverted lists 318) discussed above may be used in efficiently determining score-bounds of all cells in $\mathcal{G}$, thus avoiding the generation of new inverted lists for the interesting regions.

Using the example of FIG. 11, the cell g (included within region 9 (1102)) is associated with 9 interesting regions (8 regions external to g, and 1 internal to g). Score-bounds of the internal regions of all cells in a grid may be computed efficiently, as a single scan over $\mathcal{D}$ is sufficient to assign a score-bound in the internal regions of each cell in $\mathcal{G}$. RegionTA (as discussed above) may then be performed for each external region of g. Score-bound(g) may then be determined as the maximum of these 9 score-bounds. However, it may be desirable that i) the algorithm be aware of the region boundaries while probing entries in the inverted lists to determine correct bounds, and that ii) appropriate region-specific MINDIST definitions be utilized during score computation (e.g., as shown in Equation 7 above). For example, it may be desirable for RegionTA inside Interesting Region 7 to be aware of its region boundaries and to consider only those entries in the inverted lists that correspond to objects $O_1$ (510) and $O_5$ (518) during score-bound computation (i.e., Score-bound(Region7, g, $n_\tau$)).

Algorithm 3 as shown below more formally illustrates example steps that may be performed for obtaining score-bounds of a grid (SGB($n_\tau$)).

---

Algorithm 3
Algorithm 3: ComputeSGB($n_\tau$): Example algorithm to compute score-bounds at a grid Data: $\mathcal{G}$, a grid
$n_\tau$, trie node
Result: spatial grid of bounds
for ∀ g ∈ $\mathcal{G}$ do

---

Algorithm 3
Algorithm 3: ComputeSGB($n_\tau$): Example algorithm to compute score-bounds at a grid score-bound (g, $n_\tau$) =
argmax ∀$_{InterestingRegion}$ ∈ $\mathcal{G}$Score-bound(InterestingRegion, g, $n_\tau$)
end for
return SGB($n_\tau$);

---

As shown above, input to Algorithm 3 includes at least a grid $\mathcal{G}$ and a trie node $n_\tau$. For every cell g in the grid $\mathcal{G}$, the score-bound at that cell g may be determined as maximal score-bound of all interesting regions of g, as discussed above.

According to an example embodiment, a cover with $\mathcal{R}$ regions may be determined, based on SGB ($n_\tau$). Intuitively, a cover may be generated by merging cells of SGB ($n_\tau$). However, it may be desirable to determine $\mathcal{R}$ cover such that the score-bound of every region r∈$\mathcal{R}$ (score-bound(r, $n_\tau$)) is correct. This condition may be satisfied if Score-bound(r, $n_\tau$) is determined as the maximum of the score-bounds of the cells inside the region r. According to an example embodiment, the Score-bound of a region may be determined in accordance with Equation 8:

$$\text{Score-bound}(r, n_\tau) = \text{argmax}_{\forall g \in r} \text{Score-bound}(g, n_\tau) \quad (8)$$

Different determinations of $\mathcal{R}$ covers may generate merged regions having differences in values of score-bounds, thus introducing more or less error in ultimate decisions regarding pruning of subtrees during a search of the generated search structure. According to an example embodiment, an error function may be utilized in determination of a more efficient $\mathcal{R}$ cover. For example, an error function may be determined based on considering a cell g that may be merged inside a region r. The error may then be determined as the difference between the error score-bound of the cell and the score-bound of the region targeted for merging with the cell as denoted by Equation 9:

$$\text{Error}(g, n_\tau) = |\text{Score-bound}(g, n_\tau) - \text{Score-bound}(r, n_\tau)| \quad (9)$$

According to an example embodiment, a cover generation technique may adaptively determine $\mathcal{R}$ regions. However, it may be desirable to optimally minimize the maximum error of the individual cells, denoted more formally as:

Given an SGB($n_\tau$), create $\mathcal{R}$ cover such that ∀g∈SGB ($n_\tau$), Error(g, $n_\tau$) is minimized.

According to an example embodiment, a quad tree QT may be generated for storing the cells of SGB($n_\tau$) (i.e., the leaf nodes of QT are the actual cells of SGB($n_\tau$)). An $\mathcal{R}$-size frontier of QT may then be selected that optimizes the maximum-error metric.

According to an example embodiment, the $\mathcal{R}$-size frontier of QT may be determined based on sorting intermediate nodes (i.e, non-terminal nodes) of QT in an increasing order of error. In accordance with the maximum-error metric discussed above, an error associated with an intermediate quad tree node (τ) may represent the maximum difference in score-bounds of its descendent cells, i.e., argmax$_{\forall g, g'}$|Score-bound(g, $n_\tau$)−Score-bound (g', $n_\tau$)|.

According to an example embodiment, Algorithm 4 as shown below more formally illustrates example steps that may be performed for selecting the $\mathcal{R}$-size Frontier of QT discussed above.

---
Algorithm 4
Algorithm 4: Select𝓡Frontier: Example algorithm to select 𝓡-size
Frontier of QT
---

Data: QT, a quad tree of SGB($n_r$)
    𝓡, an integer
Result: 𝓡-size Frontier of QT
Cover = {leafnodesofQT}
𝙹 = {set of intermediate QT nodes, sorted in increasing order of error}
while |Cover| ≠ (𝓡 ± 3) do
    Consider the first node $𝙹_1$ ∈ 𝙹
    𝙹 = 𝙹 − {$𝙹_1$}
    Cover = Cover + {$𝙹_1$} − {Children$_{𝙹_1}$}
end while
return Cover;

---

As shown above, input to Algorithm 4 includes a quad tree of SGB($n_r$) (denoted as QT) and an integer 𝓡. Initially the Cover includes the leaf (terminal) nodes of QT, which are associated with an error value of zero. A set 𝙹 is obtained that includes the intermediate nodes of QT, sorted in increasing order of error value, as discussed above.

According to an example embodiment, the desired 𝓡 regions do not overlap. Thus, when a higher order node of QT is added to the Cover, all children of the newly added node are discarded from the Cover. Algorithm 4 terminates when the Cover includes 𝓡 regions. Such a technique may be optimal, as the maximum-error monotonically propagates up from the terminal nodes in the QT.

According to an example embodiment, a bound materialized tree (e.g., trie structure 140 and associated quad tree structures 160) may be generated based on performing node and cover selection techniques as discussed above. Subsequently, for each trie node $n_r$ selected, the regions in 𝓡-cover and the score bound for each region may be stored in association with the selected node $n_r$. Since each region may be represented as a node in the quad-tree over the basic grid 𝒢 of $n_r$, a single number that encodes the quad-tree node may be stored. At query time, the encoding may be used to efficiently determine the region that includes the query location.

An example Algorithm 5 as shown below illustrates example steps that may be performed for searching an augmented trie (e.g., a bound materialized tree BMT) to obtain the k-highest score database objects (Res(Q,k)) in response to receiving a prefix query string Q.

---
Algorithm 5
Algorithm 5: Example efficient algorithm for location-aware TAS
---

Data: Trie $T_{BM}$, Query Q, an integer k, priority queues $PQ_M$, GPQ
Result: top k object results of location aware type ahead search
Perform lookup in trie $T_{BM}$ to determine QMN(Q)
repeat
    for all branches ∈ QMN(Q) do
        Perform DFS to obtain the first materialized node in that branch
        if encountered node is a leaf $l_r$ then
            Update GPQ = LeafNodeSearch ($l_r$);
        end if
    end for
    BNode = Dequeue($PQ_M$)
    if (BoundCheck(BNode,GPQ.$k_{th}$score) = true) then
        return Res(Q, k);
        Exit;
    else
        Continue from BNode
    end if
until (Subtree (QMN(Q)) is not visited)
return Res(Q, k);

---

As shown above, input to Algorithm 5 includes a bound materialized tree (Trie $T_{BM}$), a query Q, an integer k, and priority queues $PQ_M$ and GPQ. The priority queue $PQ_M$ (e.g., priority queue 158) may store the query location specific bounds of the materialized frontier of QMN(Q). Further, the current best-k results may be maintained in the global priority queue GPQ (e.g., first priority queue 156). A function denoted as Dequeue($PQ_M$) may provide the highest score-bound included in $PQ_M$, that may then be compared with the k-th largest score in GPQ during a BoundCheck operation, as discussed below.

If query Q=(str, loc), then the non-terminal node in the trie that matches the query Q may first be determined, and may be denoted as QMN(Q). The Subtree(QMN(Q)) may then be searched in a Best-First-Search manner, to obtain the first materialized node located in each branch of Subtree(QMN(Q)) (i.e., to determine the closest materialized frontier of the Subtree(QMN(Q))). As terminal (leaf) nodes are encountered, the GPQ is updated based on LeafNodeSearch ($l_r$) (similarly as discussed above with regard to Algorithm 1), to maintain a current list of k-highest score objects encountered thus far. As materialized non-terminal nodes are encountered, a BoundCheck operation is initiated which compares the Q.loc specific highest score-bound (i.e., the maximum score that any object in the untraversed Subtree(QMN(Q)) may have) with the k-th largest object encountered score so far. As shown in Algorithm 5, BoundCheck is satisfied if the k-th score value is not smaller than that of the Q.loc specific highest score-bound, in which case Algorithm 5 immediately terminates and returns the current k objects as Res(Q, k). Thus, the search may be terminated without a traversal of terminal nodes that may be located in subtrees of materialized non-terminal nodes of the trie.

Otherwise, the materialized frontier is pushed further down, and the same steps are repeated, unless i) BoundCheck is satisfied, or ii) Subtree(QMN(Q)) is completely traversed.

Figure 12:
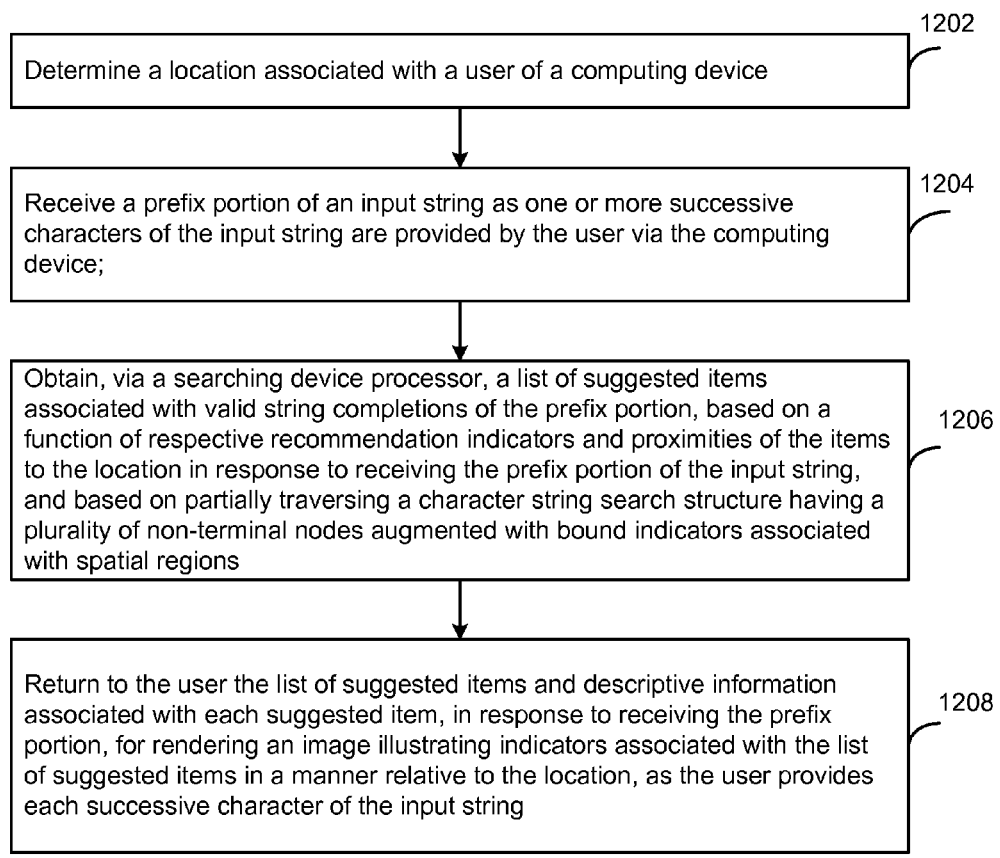
FIG. 12 is a flowchart illustrating example operations of the system of FIG. 1.

FIG. 12 is a flowchart illustrating example operations of the system of FIG. 1. As shown in FIG. 12, a location associated with a user of a computing device may be determined (1202). For example, the determination engine 104 of FIG. 1 may determine the location 106 associated with the user 108 of the computing device 110, 112, as discussed above.

A prefix portion of an input string may be received as one or more successive characters of the input string are provided by the user via the computing device (1204). For example, the prefix string receiving engine 116 may receive the prefix portion 118 of an input string as one or more successive characters of the input string are provided by the user 108 via the computing device 110, 112.

A list of suggested items associated with valid string completions of the prefix portion may be obtained, via a searching device processor, based on a function of respective recommendation indicators and proximities of the items to the location in response to receiving the prefix portion of the input string, and based on partially traversing a character string search structure having a plurality of non-terminal nodes augmented with bound indicators associated with spatial regions (1206). For example, the suggestion engine 124 may obtain, via the searching device processor 126, the list of suggested items 128 based on a function of respective recommendation indicators and proximities of the items to the location 106 in response to receiving the prefix portion 118 of the input string, and based on partially traversing the character string search structure 130 having the plurality of non-terminal nodes 132 augmented with bound indicators 134 associated with spatial regions.

The list of suggested items and descriptive information associated with each suggested item may be returned to the user, in response to receiving the prefix portion, for rendering an image illustrating indicators associated with the list of suggested items in a manner relative to the location, as the user provides each successive character of the input string (1208). For example, the rendering engine 150 may return to the user 108 the list of suggested items 128 and descriptive information associated with each suggested item, in response to receiving the prefix portion 118, for rendering an image illustrating indicators associated with the list of suggested items 128 in a manner relative to the location 106, as the user 108 provides each successive character of the input string.

Figure 13A:
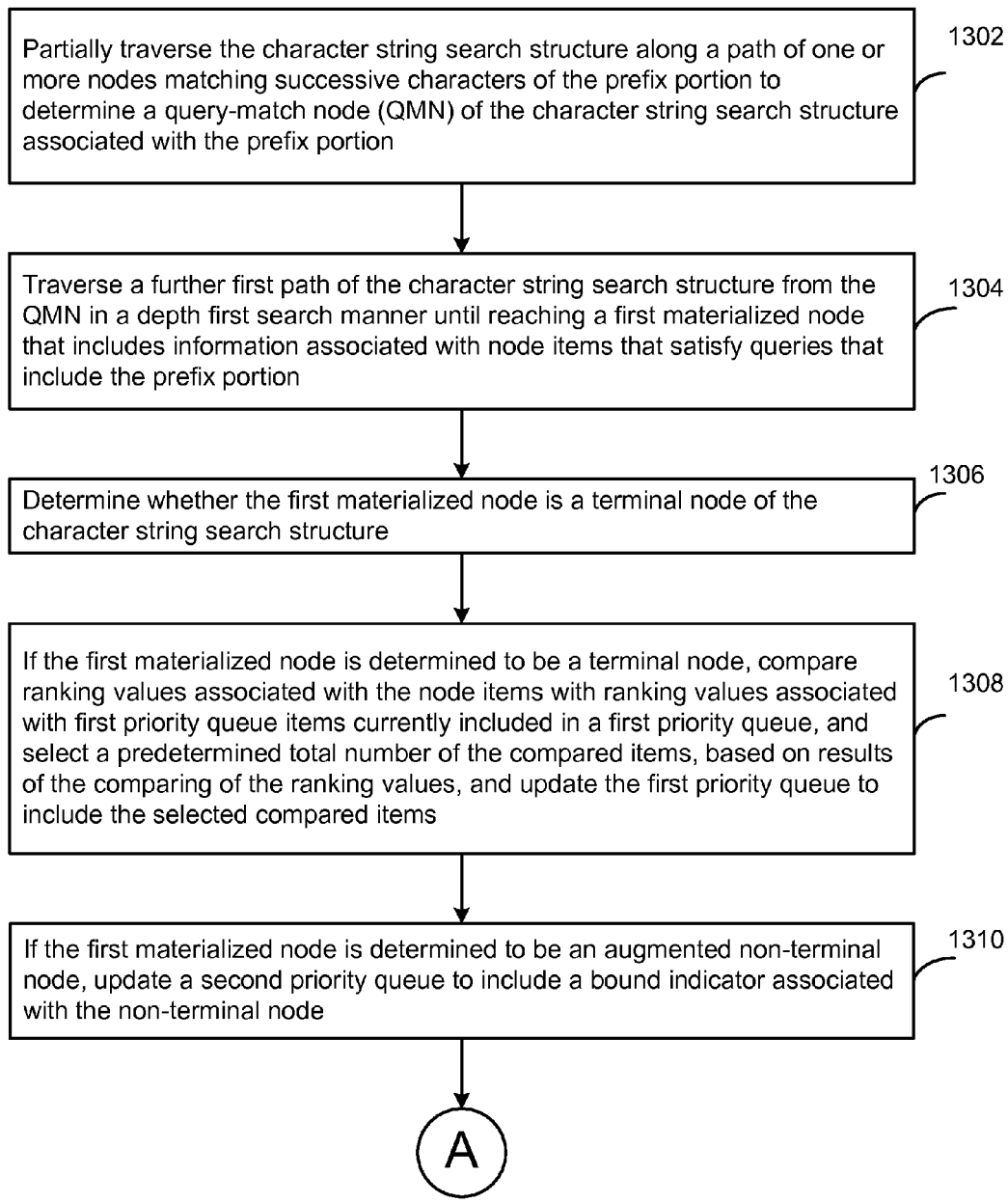
FIG. 13a-13b is a flowchart illustrating further example operations of the system of FIG. 1.
Figure 13B:
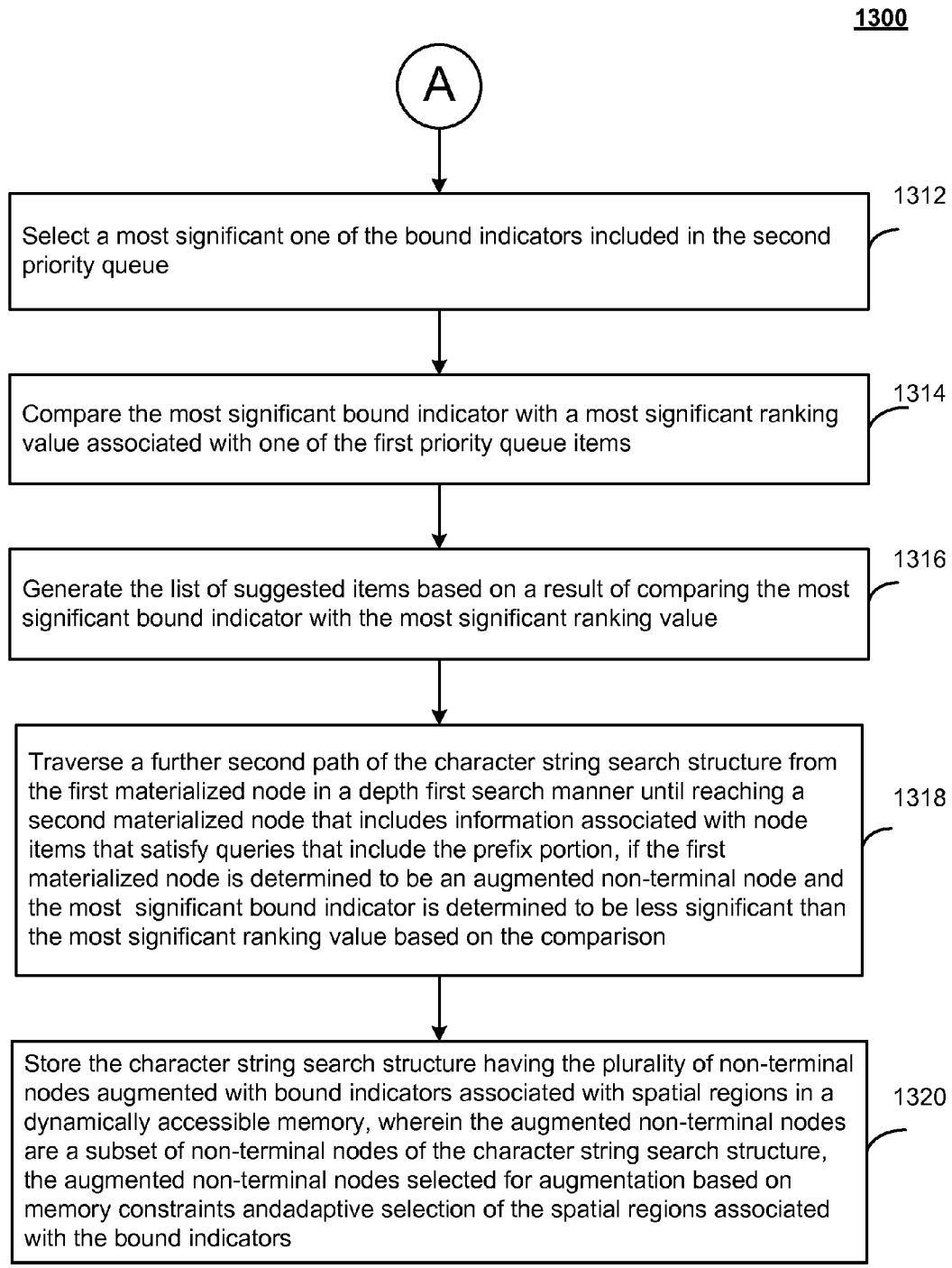

FIG. 13a-13b is a flowchart illustrating further example operations of the system of FIGS. 1a-1c. As shown in FIG. 13a-13b, the character string search structure may be partially traversed along a path of one or more nodes matching successive characters of the prefix portion to determine a query-match node (QMN) of the character string search structure associated with the prefix portion (1302). For example, the traversal engine 136 may partially traverse the character string search structure 130 along a path of one or more nodes matching successive characters of the prefix portion 118 to determine the query-match node (QMN) of the character string search structure 130 associated with the prefix portion 118.

A further first path of the character string search structure may be traversed from the QMN in a depth first search manner until reaching a first materialized node that includes information associated with node items that satisfy queries that include the prefix portion (1304). For example, the traversal engine 136 may traverse a further first path of the character string search structure 130 from the QMN in a depth first search manner until reaching a first materialized node that includes information associated with node items that satisfy queries that include the prefix portion 118.

It may be determined whether the first materialized node is a terminal node of the character string search structure (1306). For example, the traversal engine 136 may determine whether the first materialized node is a terminal node 142 of the character string search structure 130.

If the first materialized node is determined to be a terminal node, ranking values associated with the node items may be compared with ranking values associated with first priority queue items currently included in a first priority queue, and a predetermined total number of the compared items may be selected, based on results of the comparing of the ranking values, and the first priority queue may be updated to include the selected compared items (1308). For example, the traversal engine 136 may compare ranking values associated with the node items with ranking values associated with first priority queue items currently included in a first priority queue 156, and select a predetermined total number of the compared items, based on results of the comparing of the ranking values, and update the first priority queue 156 to include the selected compared items, as discussed above with regard to FIGS. 1a-1c.

If the first materialized node is determined to be an augmented non-terminal node, a second priority queue may be updated to include a bound indicator associated with the non-terminal node (1310). For example, the traversal engine 136 may update the second priority queue 158 to include the bound indicator 134 associated with the non-terminal node 132.

A most significant one of the bound indicators included in the second priority queue may be selected (1312). For example, the traversal engine 136 may select one of the bound indicators 134 included in the second priority queue 158.

The most significant bound indicator may be compared with a most significant ranking value associated with one of the first priority queue items (1314). For example, the traversal engine 136 may compare the most significant bound indicator with a most significant ranking value associated with one of the items of first priority queue 156.

The list of suggested items may be generated based on a result of comparing the most significant bound indicator with the most significant ranking value (1316). For example, the traversal engine 136 may generate the list of suggested items 128 based on the result of comparing the most significant bound indicator 134 with the most significant ranking value.

A further second path of the character string search structure may be traversed from the first materialized node in a depth first search manner until reaching a second materialized node that includes information associated with node items that satisfy queries that include the prefix portion, if the first materialized node is determined to be an augmented non-terminal node and the most significant bound indicator is determined to be less significant than the most significant ranking value based on the comparison (1318). For example, the traversal engine 136 may traverse a further second path of the character string search structure 130 from the first materialized node in a depth first search manner until reaching a second materialized node that includes information associated with node items that satisfy queries that include the prefix portion 118, if the first materialized node is determined to be an augmented non-terminal node 132 and the most significant bound indicator is determined to be less significant than the most significant ranking value based on the comparison.

The character string search structure having the plurality of non-terminal nodes augmented with bound indicators associated with spatial regions may be stored in a dynamically accessible memory, wherein wherein the augmented non-terminal nodes are a subset of non-terminal nodes of the character string search structure, the augmented non-terminal nodes selected for augmentation based on memory constraints and adaptive selection of the spatial regions associated with the bound indicators (1320). For example, the memory 138 may store the character string search structure 130 having the plurality of non-terminal nodes 132 augmented with bound indicators 134, as discussed above with regard to FIGS. 1a-1c.

Figure 14A:
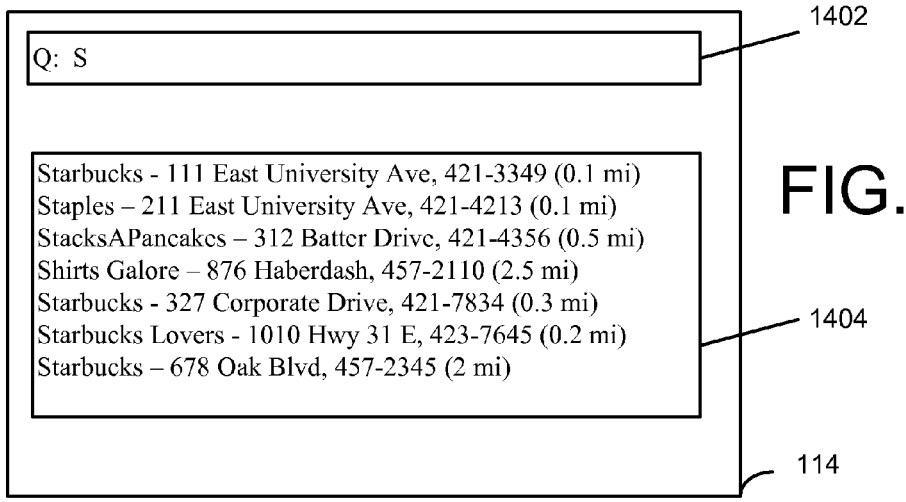
FIGS. 14a-17b illustrate example user views of a display of progressive spatial search results.

FIGS. 14a-17b illustrate example user views of a display of progressive spatial search results. As shown in FIG. 14a, the user (e.g., user 108) may progressively enter a character string in a text entry area 1402 that is associated with the display 114 that may be in communication with the computing device 110, 112 discussed with regard to FIG. 1. As the user progressively provides characters, a list of suggested items (e.g., the suggested items 128 of FIG. 1) is rendered in a response display area 1404 for viewing by the user. As shown in FIG. 14a, the suggested items 128 may be rendered as a list that is displayed in descending order of ranking of the suggested items 128.

The suggested items 128 may be displayed along with descriptive information associated with each of the items, as a search based on the prefix string "S" may return the k most relevant objects (including descriptive information associated with each object as stored in the database). As shown in FIG. 14a, the descriptive information may include a name, an address, and a phone number associated with each suggested item 128. The descriptive information may also include recommendation information such as ratings and popularity indicators. In FIG. 14a, the descriptive information is also displayed including a distance of the suggested item 128 from the current location 106 associated with the user 108. The distance may be determined based on the current location 106 associated with the user 108 and location information 106 associated with each suggested item 128. As shown in FIG. 14a, the suggested items 128 returned in response to a prefix string query "S" include the k highest ranked database objects that are associated with a character string having "S" as a prefix. For example, "Starbucks", "Shirts Galore", and "Staples" objects are associated with strings having "S" as a prefix.

Further, multiple database objects may be associated with a particular string, and multiple strings may be associated with a single database object. For example, the string "Starbucks" may identify multiple Starbucks coffee shops, as shown in FIG. 14a. If the user enters a string "coffee", a search may also return objects representing "Starbucks" coffee shops, if the descriptive string "coffee" is associated with the specific database objects.

Figure 14B:
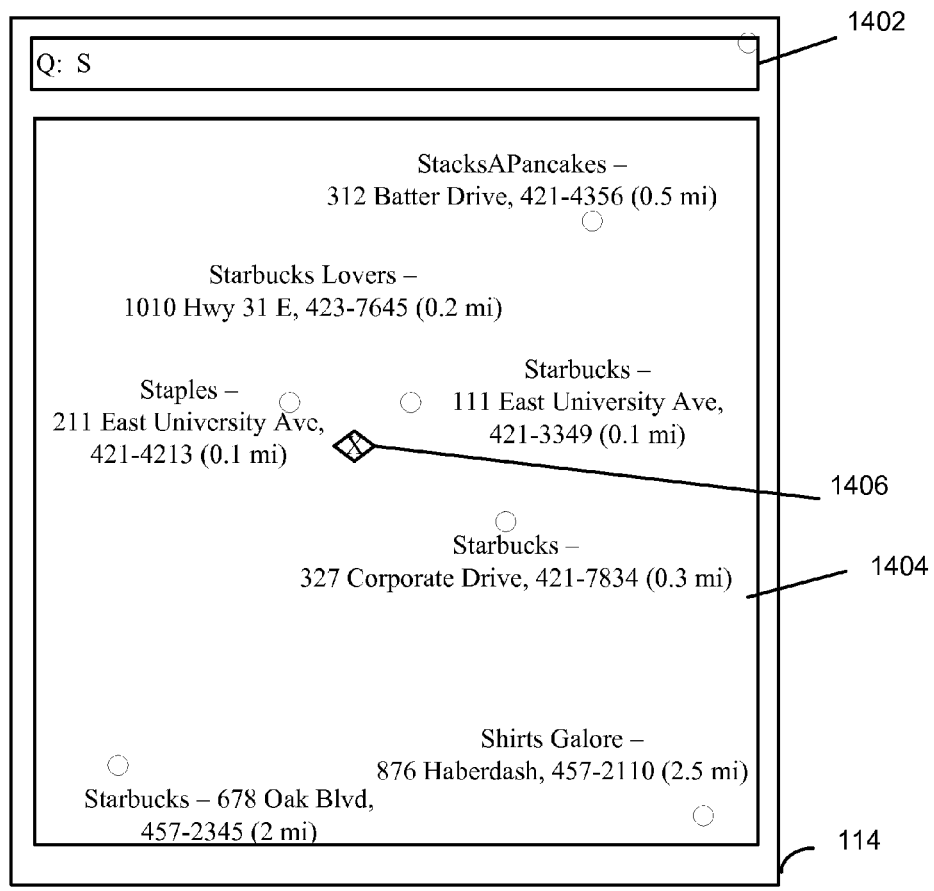

As shown in FIG. 14b, a location icon 1406 may graphically indicate the current location 106 associated with the user 108. As shown in FIG. 14b, the suggested items 128 may be rendered in a manner that illustrates the locations of the suggested items 128 relative to the current location 106 associated with the user 108.

According to an example embodiment, the current location 106 may be determined based on GPS sensing, network address of the computing device 110, 112, tracking of mobile phone transmission stations, or location information provided by the user 108.

Figure 15A:
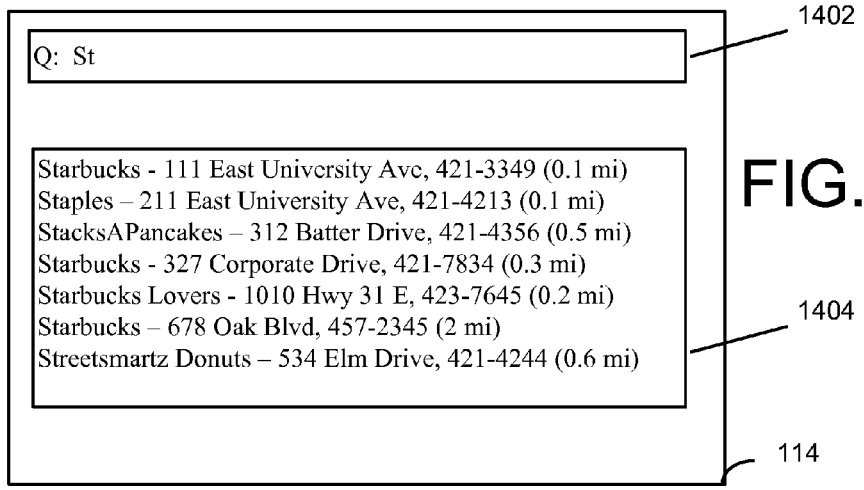
Figure 15B:
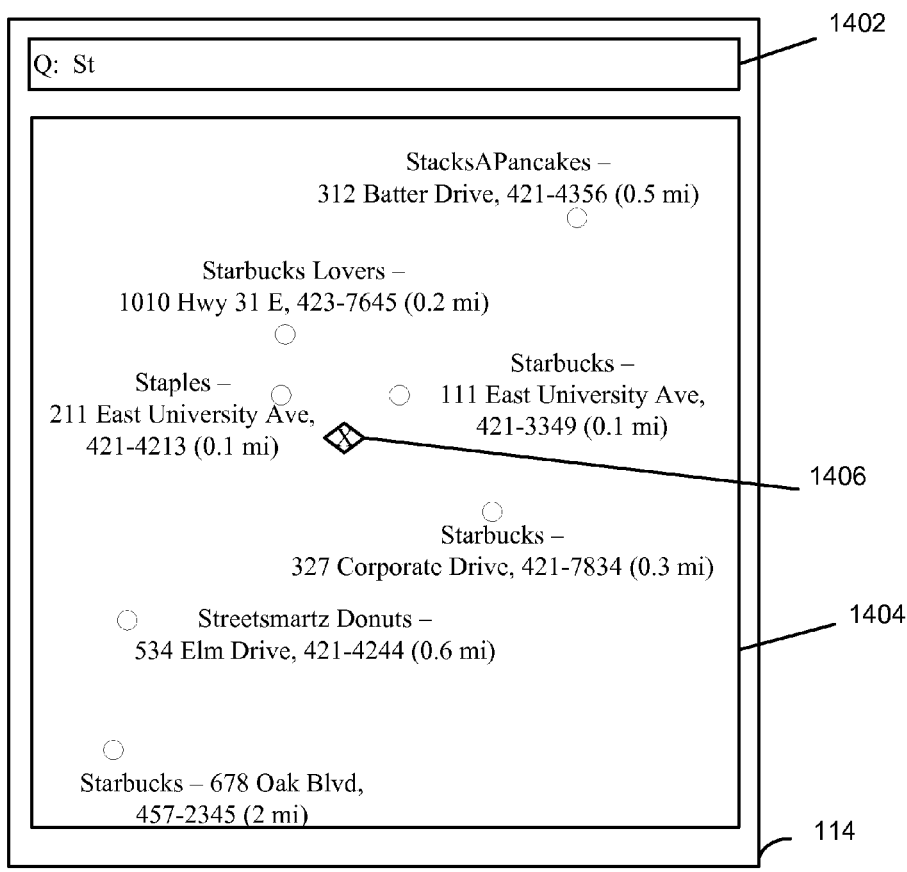

FIGS. 15a-15b illustrate example user views of the display of progressive spatial search results after the user 108 has provided the prefix string "St" in the text entry area 1402. The suggested item 128 "Shirts Galore" is no longer shown as a result, as "Shirts Galore" is not a valid completion of the prefix query "St". According to an example embodiment, the current location 106 associated with the user 108 may change as the user 108 continues to progressively provide characters of the search string. Thus, the suggested items 128 may vary as the location 106 changes with each additional prefix string query, and proximities of the suggested items 128 to the current location 106 may deteriorate (as other retrieval items 146 become more relevant based on location).

Figure 16A:
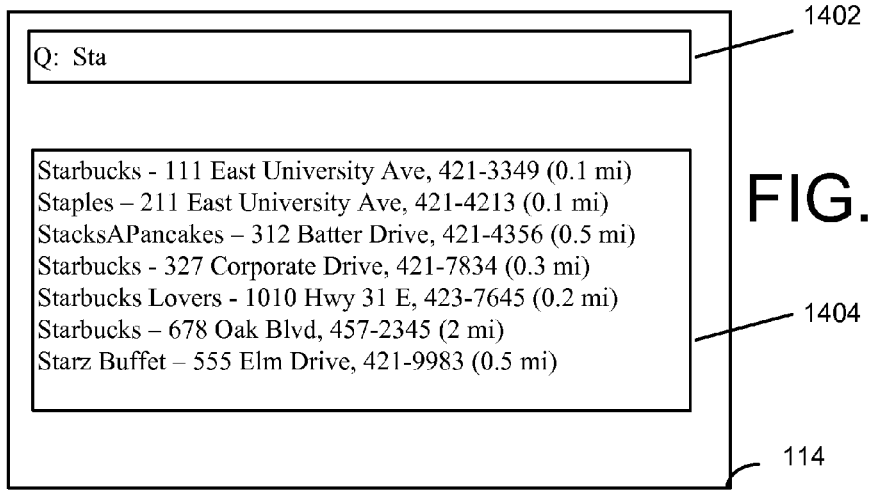
Figure 16B:
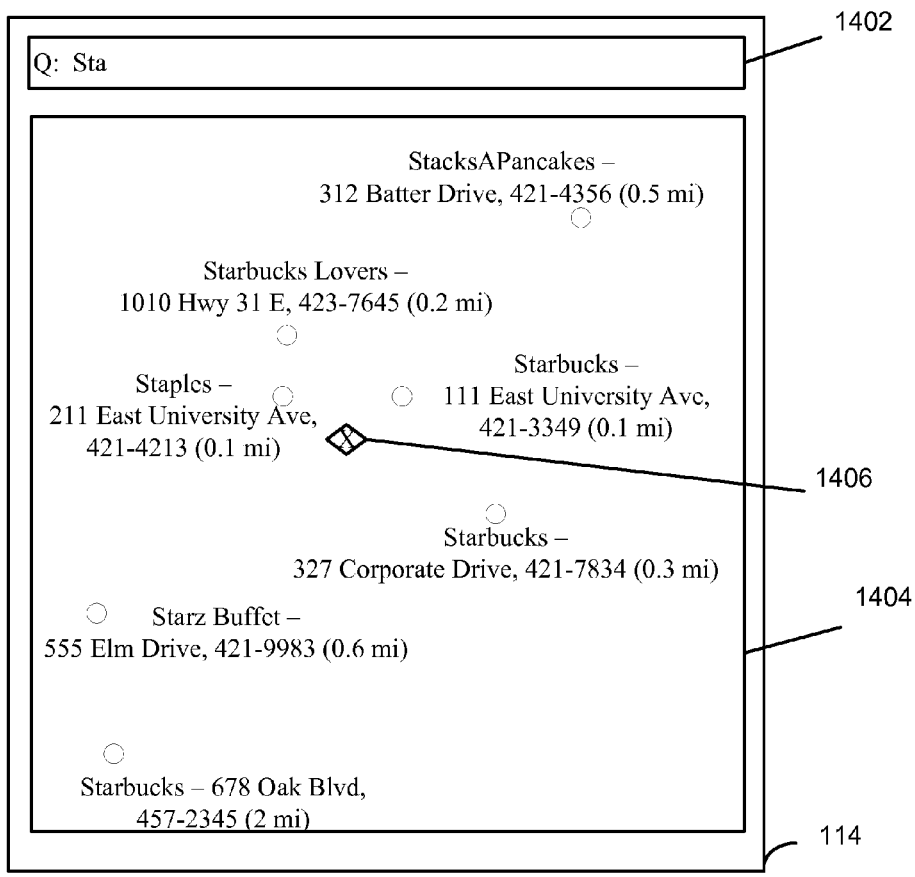
Figure 17A:
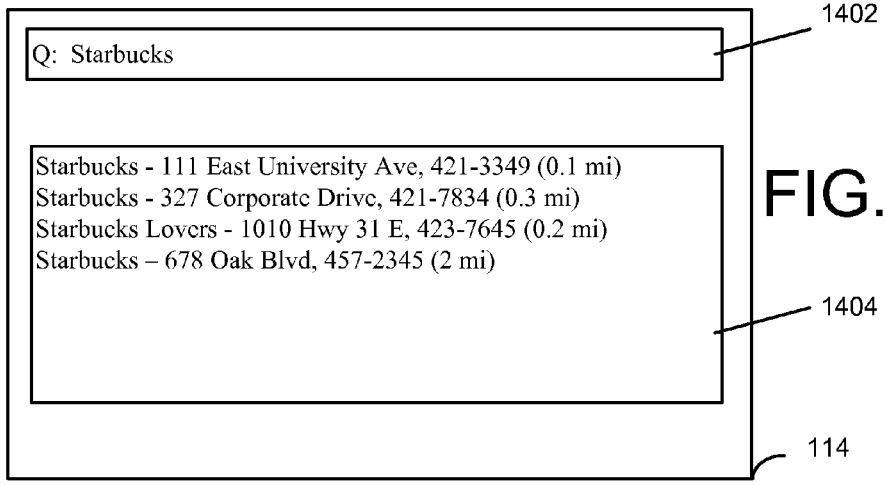
Figure 17B:
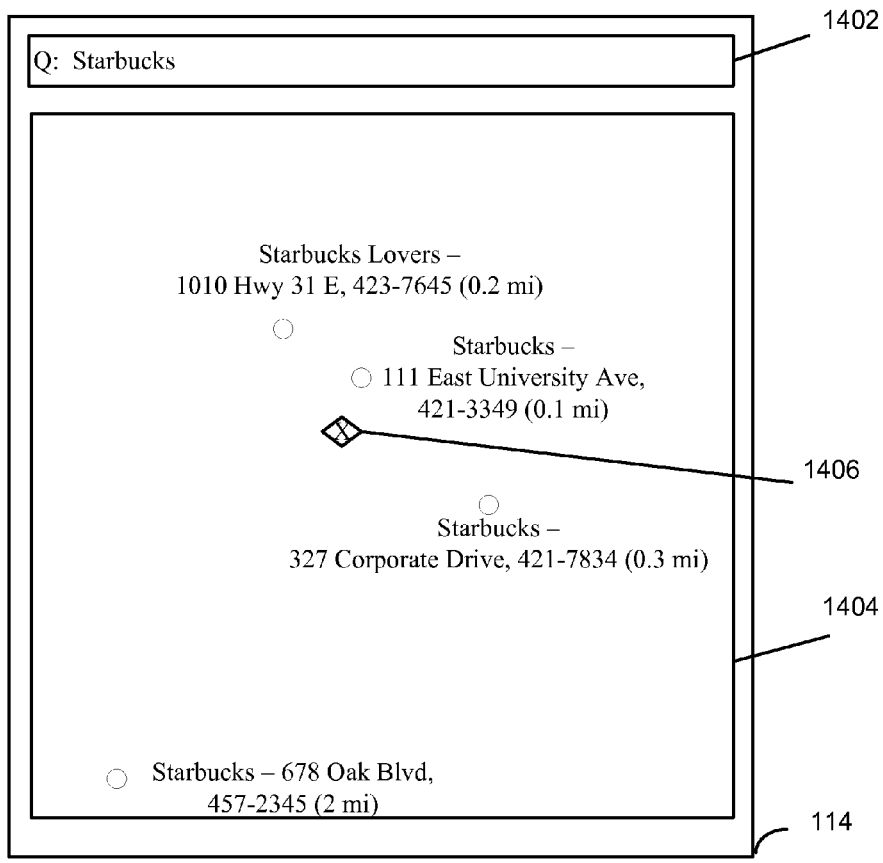

FIGS. 16a-16b illustrate example user views of the display of progressive spatial search results after the user 108 has provided the prefix string "Sta" in the text entry area 1402, and FIGS. 17a-17b illustrate example user views of the results after the user 108 has provided the prefix string "Starbucks" in the text entry area 1402.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A mobile device comprising:
a processor;
a display;
a prefix string receiving engine, when executed by the processor, configured to detect a prefix portion of an input string as one or more successive characters of the input string are provided by the user via the mobile device;
a location determination engine, when executed by the processor, configured to automatically determine a current location associated with the user of the mobile device at substantially the same time as a detection of the input string provided by the user;
a suggestion engine, when executed by the processor, in response to detecting the prefix portion of the input string, configured to obtain a list of suggested businesses associated with valid string completions of the prefix portion, and sort the obtained list of suggested businesses based on at least rating indicators of the suggested businesses and spatial proximities of the suggested businesses to the current location, wherein the suggestion engine is further configured to: (1) send at least one detected prefix portion to a server comprising a search engine, (2) receive, from the search engine, at least one autocompleted string identifying a name of a business based on the at least one detected prefix portion, and (3) upon receiving a selection of the at least one autocompleted string by the user, obtain the list of the suggested businesses from the search engine; and
a rendering engine, when executed by the processor, configured to, display to the user via the display a rating indicator associated with each of at least a subset of businesses in the list of the suggested businesses and display to the user via the display an image illustrating a geographic location of each of at least a subset of businesses in the suggested list of businesses in a manner relative to the current location of the user of the mobile device.

2. The mobile device of claim 1, wherein the one or more successive characters of the input string are provided by the user via one of a touchscreen, touchpad, keyboard, keypad, audio input device, or another input sensing device.

3. The mobile device of claim 1, wherein the current location associated with the user of the mobile device is determined using global positioning system.

4. The mobile device of claim 1, wherein the rendering engine is further configured to display to the user a geographic distance of each of the suggested businesses from the current location associated with the user of the mobile device.

5. The mobile device of claim 1, wherein the rendering engine is further configured to display to the user a geographic address of each of the suggested businesses.

6. The mobile device of claim 1, wherein the rendering engine is further configured to display to the user a name of each of the suggested businesses.

7. The mobile device of claim 1, wherein the image on the display illustrating the geographic location of each of the at least the subset of the businesses in the suggested list of businesses further comprises the current location associated with the user of the mobile device.

8. A method implemented by at least one processor in a mobile device, the method comprising:
detecting a prefix portion of an input string as one or more successive characters of the input string are provided by the user via the mobile device;
automatically determining a current location associated with the user of the mobile device at substantially the same time as a detection of the input string provided by the user;
in response to detecting the prefix portion of the input string, obtaining a list of suggested businesses associated with valid string completions of the prefix portion and sorting the obtained list of suggested businesses based on at least rating indicators of the suggested businesses and spatial proximities of the suggested businesses to the current location, wherein the obtaining the list of the suggested businesses further comprises: (1) sending at least one detected prefix portion to a server comprising a search engine, (2) receiving, from the search engine, at least one autocompleted string identifying a name of a business based on the at least one detected prefix portion, and (3) upon receiving a selection of the at least one autocompleted string by the user, obtaining the list of the suggested businesses from the search engine; and
displaying to the user a rating indicator associated with each of at least a subset of businesses in the list of the suggested businesses and displaying to the user an image illustrating a geographic location of each of at least a subset of businesses in the suggested list of businesses in a manner relative to the current location of the user of the mobile device.

9. The method of claim 8, wherein the one or more successive characters of the input string are provided by the user via one of a touchscreen, touchpad, keyboard, keypad, audio input device, or another input sensing device.

10. The method of claim 8, wherein the current location associated with the user of the mobile device is determined using global positioning system.

11. The method of claim 8 further comprising displaying to the user a geographic distance of each of the suggested businesses from the current location associated with the user of the mobile device.

12. The method of claim 8 further comprising displaying to the user a geographic address of each of the suggested businesses.

13. The method of claim 8 further comprising displaying to the user a name of each of the suggested businesses.

14. The method of claim 8, wherein the image illustrating the geographic location of each of the at least the subset of the businesses in the suggested list of businesses further comprises the current location associated with the user of the mobile device.

15. A non-transitory computer-readable medium comprising instructions configured to, when executed by at least one processor in a mobile device, cause the at least one mobile device to:
detect a prefix portion of an input string as one or more successive characters of the input string are provided by the user via the mobile device;

automatically determine a current location associated with the user of the mobile device at substantially the same time as a detection of the input string provided by the user;

in response to a detection of the prefix portion of the input string, obtain a list of suggested businesses associated with valid string completions of the prefix portion and sort the obtained list of suggested businesses based on at least rating indicators of the suggested businesses and spatial proximities of the suggested businesses to the current location, wherein to obtain the list of the suggested businesses, the instructions are further configured to, when executed by the at least one processor in the mobile device, cause the at least one mobile device to (1) send at least one detected prefix portion to a server comprising a search engine, (2) receive, from the search engine, at least one autocompleted string identifying a name of a business based on the at least one detected prefix portion, and (3) upon receiving a selection of the at least one autocompleted string by the user, obtain the list of the suggested businesses from the search engine; and display to the user a rating indicator associated with each of at least a subset of businesses in the list of the suggested businesses and display to the user an image illustrating a geographic location of each of at least a subset of businesses in the suggested list of businesses in a manner relative to the current location of the user of the mobile device.

16. The non-transitory computer-readable medium of claim 15, wherein the one or more successive characters of the input string are provided by the user via one of a touchscreen, touchpad, keyboard, keypad, audio input device, or another input sensing device.

17. The non-transitory computer-readable medium of claim 15, wherein the current location associated with the user of the mobile device is determined using global positioning system.

18. The non-transitory computer-readable medium of claim 15, wherein the instructions are further configured to cause the mobile device to display to the user a geographic distance of each of the suggested businesses from the current location associated with the user of the mobile device.

19. The non-transitory computer-readable medium of claim 15, wherein the instructions are further configured to cause the mobile device to display to the user a geographic address of each of the suggested businesses and a name of each of the suggested businesses.

20. The non-transitory computer-readable medium of claim 15, wherein the image illustrating the geographic location of each of the at least the subset of the businesses in the suggested list of businesses further comprises the current location associated with the user of the mobile device.

* * * * *